United States Patent [19]
Yamamoto et al.

[11] Patent Number: 5,641,548
[45] Date of Patent: Jun. 24, 1997

[54] BLOW MOLDED ARTICLES

[75] Inventors: Kazuhito Yamamoto; Hiroji Niimi; Yoji Yamamoto; Susumu Hatabu, all of Kuga-gun, Japan

[73] Assignee: Mitsui Petrochemical Industries, Ltd., Tokyo, Japan

[21] Appl. No.: 301,440

[22] Filed: Sep. 9, 1994

Related U.S. Application Data

[63] Continuation of Ser. No. 029,914, Mar. 11, 1993, abandoned, which is a continuation of Ser. No. 569,993, Aug. 20, 1990, abandoned.

[30]     Foreign Application Priority Data

| Aug. 19, 1989 | [JP] | Japan | 1-225758 |
| Aug. 31, 1989 | [JP] | Japan | 1-225755 |
| Aug. 31, 1989 | [JP] | Japan | 1-225756 |
| Aug. 31, 1989 | [JP] | Japan | 1-225757 |
| Aug. 31, 1989 | [JP] | Japan | 1-225760 |
| Aug. 31, 1989 | [JP] | Japan | 1-225761 |
| Aug. 31, 1989 | [JP] | Japan | 1-225762 |
| Aug. 31, 1989 | [JP] | Japan | 1-225763 |
| Aug. 31, 1989 | [JP] | Japan | 1-225764 |

[51] Int. Cl.$^6$ ............................................. B65D 23/00
[52] U.S. Cl. .................. 428/35.7; 428/36.92; 264/512; 528/173
[58] Field of Search ............... 428/35.7, 36.92; 264/512; 528/173; 215/1 C

[56]     References Cited

U.S. PATENT DOCUMENTS

| 4,390,683 | 6/1983 | Yatsu et al. | 528/194 |
| 4,398,017 | 9/1983 | Go | 528/173 |
| 4,692,506 | 9/1987 | Yatsu et al. | 428/194 |

FOREIGN PATENT DOCUMENTS

| 0105825 | 7/1983 | European Pat. Off. |
| 0143640 | 5/1985 | European Pat. Off. |
| 0-383324 | 8/1990 | European Pat. Off. |
| 2052363 | 6/1979 | United Kingdom ............ B29C 17/03 |
| 2188052 | 9/1987 | United Kingdom |

OTHER PUBLICATIONS

Database WPIL, accession No. 85–035365 [06] Derwent Publ., Ltd. London, GB & JPA 59 230 022 (Mitsui Petrochemical) 24–12–1984.

Database WPIL, accession No. 86–134847 [21] Derwent Publ. Ltd., London, GB & JPA 61–072 051 (Mitsui Petrochemical) 14–04–1986.

*Primary Examiner*—Charles Nold
*Attorney, Agent, or Firm*—Sherman and Shalloway

[57]     ABSTRACT

In accordance with the present invention, there are provided blow molded articles which are composed of specific copolyesters or specific polyester resin compositions and which are highly oriented so that the stretch index as defined by the following equations becomes not less than 130 cm.

$$\text{Stretch index} = \frac{\text{Internal volume (excluding stopper portion) of oriented bottle}}{\text{Internal volume (excluding stopper portion) of unoriented preform}} \times \frac{1}{f}$$

$$f = \frac{\text{Internal surface area (excluding stopper portion) of oriented bottle}}{\text{Internal volume (excluding stopper portion) of oriented bottle}} \text{ (cm}^{-1}\text{)}$$

The blow molded articles thus provided are excellent in transparency and also excellent in moldability and gas barrier properties and, moreover, excellent also in economical efficiency.

32 Claims, 1 Drawing Sheet

BLOW MOLDED ARTICLES

This application is a continuation of application Ser. No. 08/029,914 filed Mar. 11, 1993, abandoned, which is a continuation of Ser. No. 07/569,993, filed Aug. 20, 1990, abandoned.

FIELD OF THE INVENTION

This invention relates to blow molded articles excellent in transparency, moldability, gas barrier properties and economical efficiency.

BACKGROUND OF THE INVENTION

Heretofore, glass has been widely used as a material for containers for seasonings, food oil, liquors such as beer and sake, cooling beverages such as carbonated drinks and the like, cosmetics, detergents, etc. However, glass containers are relatively high in manufacturing cost, though they are excellent in gas barrier properties, and therefore usually they are recovered after use and recycled for re-use. The drawbacks inherently associated with the glass containers, however, were such that because of heaviness for their size, they increase in shipping cost and, moreover, they are liable to break and not convenient for handling.

In order to overcome such drawbacks as mentioned above, various plastic containers have come to be used in place of the glass containers. Various plastic materials are used for the plastic containers, according to the kind of items to be preserved therein and the purpose for which the preserved items are used. Of these plastic materials, polyethylene terephthalate is used as a material, because of its excellent gas barrier properties and transparency, for containers for seasonings, cooling beverages, cosmetics and detergents. In these plastic containers especially for beer or carbonated drinks where the most severity of gas barrier properties is required, it may be said that even polyethylene terephthalate is not sufficient to meet such severe requirement. When these containers requiring severe gas barrier properties are intended to be manufactured from polyethylene terephthalate, it was necessary to improve gas barrier properties of the resulting container by increasing said container in wall thickness.

In the attempt as mentioned above, however, there was such a problem that the manufacturing cost of thick-wall bottles formed from polyethylene terephthalate becomes higher than that of thin-wall bottles, because the amount of the polyethylene terephthalate necessary for forming the thick-wall bottles are large in comparison with thin-wall bottles.

Under such circumstances, there is an attempt to obtain bottles excellent in gas barrier properties and economical efficiency from polyethylene terephthalate by highly orienting the polyethylene terephthalate used therefor. Bottles made of highly oriented polyethylene terephthalate may be obtained by orienting thick-wall preforms. In this case, however, there is brought about such a problem that the thick-wall preforms are gradually cooled in the course of the preparation thereof, and consequently highly oriented bottles obtained from these preforms undergo clouding and eventually deteriorate in transparency.

Such problem as mentioned above, on one hand, can be solved by using preforms formed from polyethylene terephthalate high in intrinsic viscosity. However, the use of polyethylene terephthalate high in intrinsic viscosity involves another problem that such polyethylene terephthalate as having a high intrinsic viscosity is poor in stretchability or moldability and also expensive.

Japanese Patent L-O-P Publn. No. 64624/1984 discloses molded articles formed from polyalkylene isophthalate such as polyethylene isophthalate or copolymers thereof as packaging materials having good gas barrier characteristics against oxygen and carbondioxide gas. Japanese Patent L-O-P Publn. No. 67049/1984 discloses multi-layer packaging materials comprising a layer of polyalkylene isophthalate such as mentioned above or copolymers thereof and a layer of polyalkylene terephthalate such as polyethylene terephthalate or copolymers thereof, and molded articles such as bottles composed of such multi-layer packaging materials.

There is proposed a process in which polyethylene and polyethylene terephthalate are blended (Japanese Patent L-O-P Publn. No. 64658/1984).

Japanese Patent L-O-P Publn. No. 167817/1983 discloses copolyesters obtained by copolymerization of isophthalic acid as dicarboxylic acid, and ethylene glycol and 1,3-bis (2-hydroxyethoxy)benzene as a dihydroxy compound component.

Further, there has been made a proposal to manufacture bottles excellent in gas barrier properties by using polyethylene terephthalate resin compositions, prepared by mixing polyethylene terephthalate resins with other resins.

For example, in the specification of Japanese Patent Application No. 205739/1987 previously filed by the present applicant, there are proposed PET resin compositions having gas barrier properties capable of withstanding preservation and shipment of carbonated drinks, said resin compositions comprising a blend of PET resin and polyhydroxypolyether resin. The containers molded from the above-mentioned PET resin compositions are superior in gas barrier properties to containers made of conventional PET resins.

Furthermore, the present applicant proposes by way of Japanese Patent L-O-P Publn. No. 72051/1986 PET resin compositions excellent in transparency, said PET resin compositions being obtained by mixing PET resin with copolymerized polyester resins.

Including of course such proposals as referred to above, the researches in improving transparency and gas barrier properties of PET resin compositions have heretofore been directed to place importance on the constitution of PET resin composition, and no attention has been focused on the draw ratio to be employed at the time when blow molded articles such as containers are prepared by stretching PET resin preforms.

OBJECT OF THE INVENTION

The present invention is intended to solve such drawbacks associated with the prior art as mentioned above, and an object of the invention is to provide blow molded articles molded from copolyesters, said molded articles being excellent in moldability and gas barrier properties as well as in transparency, and also excellent in economical efficiency.

A further object of the invention is to provide blow molded articles molded from polyester resin compositions improved in gas barrier properties without marring transparency and mechanical properties of polyethylene terephthalate.

SUMMARY OF THE INVENTION

The first blow molded articles of the present invention are characterized in that the blow molded articles are composed of a copolyester having an intrinsic viscosity [η] of 0.5–1.5 dl/g formed by esterification of dicarboxylic acid with a dihydroxy compound component and a polyfunctional hydroxy compound, said dicarboxylic acid comprising 0–80 mol % of terephthalic acid and 20–100 mol % of isophthalic acid, said dihydroxy compound component comprising 10–95 mol % of ethylene glycol and 5–90 mol % of 1,3-bis(2-hydroxyethyoxy)benzene, and said polyfunctional hydroxy compound having at least three hydroxyl groups and being used in an amount of 0.05–1.0 mol by part based on 100 mol by part of the dicarboxylic acid, and are highly oriented so that the stretch index defined by the following equations becomes not less than 130 cm.

$$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \quad (\text{cm}^{-1})$$

The second blow molded articles of the invention are characterized in that the blow molded articles are composed of a copolyester having an intrinsic viscosity $[\eta]$ of 0.5–1.5 dl/g formed by esterification of dicarboxylic acid with a dihydroxy compound component and a polyfunctional hydroxy compound, said dicarboxylic acid comprising 85–99 mol % of terephthalic acid and 1–15 mol % of isophthalic acid, said dihydroxy compound component comprising 80–99 mol % of ethylene glycol and 1–20 mol % of 1,3-bis(2-hydroxyethyoxy)benzene, and said polyfunctional hydroxy compound having at least three hydroxyl groups and being used in an amount of 0.05–0.3 mol by part based on 100 mol by part of the dicarboxylic acid, and are highly oriented so that the stretch index as defined above becomes not less than 130 cm.

The third blow molded articles of the invention are characterized in that the blow molded articles are composed of a copolyester formed by esterification of dicarboxylic acid with a dihydroxy compound component, said dicarboxylic acid comprising 0–80 mol % of terephthalic acid and 20–100 mol % of isophthalic acid, and said dihydroxy compound component comprising 5–90 mol % of 1,3-bis(2-hydroxyethoxy)benzene or 1,4-bis(hydroxyethoxy)benzene and 10–95 mol % of ethylene glycol, and are highly oriented so that the stretch index as defined above becomes not less than 130 cm.

The fourth blow molded articles of the invention are characterized in that the blow molded articles are composed of a copolyester having an intrinsic viscosity $[\eta]$ of 0.5–1.5 dl/g formed by esterification of dicarboxylic acid with ethylene glycol, said dicarboxylic acid comprising 80–99.5 mol % of terephthalic acid and 0.5–20 mol % of 2,6-naphthalenedicarboxylic acid, and are highly oriented so that the stretch index as defined above becomes not less than 130 cm.

The fifth blow molded articles of the invention are characterized in that the blow molded articles are composed of a copolyester having an intrinsic viscosity $[\eta]$ of 0.5–1.5 dl/g formed by esterification of dicarboxylic acid with ethylene glycol, said dicarboxylic acid comprising 85–99.5 mol % of terephthalic acid and 0.5–15 mol % of isophthalic acid, and are highly oriented so that the stretch index as defined above becomes not less than 130 cm.

The sixth blow molded articles of the invention are characterized in that the blow molded articles are composed of a copolyester having an intrinsic viscosity $[\eta]$ of 0.5–1.5 dl/g formed by esterification of dicarboxylic acid with ethylene glycol, said dicarboxylic acid comprising 85–99.5 mol % of terephthalic acid and 0.5–15 mol % of aliphatic dicarboxylic acid of 6–10 carbon atoms, and are highly oriented so that the stretch index as defined above becomes not less than 130 cm.

The seventh blow molded articles of the invention are characterized in that the blow molded articles are composed of a copolyester having an intrinsic viscosity $[\eta]$ of 0.5–1.5 dl/g formed by esterification of terephthalic acid with a dihydroxy compound component, said dihydroxy compound component comprising 85–99.5 mol % of ethylene glycol and 0.5–15 mol % of neopentyl glycol, and are highly oriented so that the stretch index as defined above becomes not less than 130 cm.

The eighth blow molded articles of the invention are characterized in that the blow molded articles are composed of a copolyester having an intrinsic viscosity $[\eta]$ of 0.5–1.5 dl/g formed by esterification of terephthalic acid with a dihydroxy compound component, said dihydroxy compound component comprising 85–99.5 mol % of ethylene glycol and 0.5–15 mol % of cyclohexanedimethanol, and are highly oriented so that the stretch index as defined above becomes not less than 130 cm.

The ninth blow molded articles of the invention are characterized in that the blow molded articles are composed of a copolyester having an intrinsic viscosity $[\eta]$ of 0.5–1.5 dl/g formed by esterification of terephthalic acid with a dihydroxy compound component, said dihydroxy compound component comprising 93–98 mol % of ethylene glycol and 2–7 mol % of diethylene glycol, and are highly oriented so that the stretch index as defined above becomes not less than 130 cm.

The tenth blow molded articles of the invention are characterized in that the blow molded articles are composed of a polyester resin composition comprising [A] 95–99% by weight of a polyethylene terephthalate resin and [B] 1–5% by weight of a copolyester formed by esterification of dicarboxylic acid with a dihydroxy compound component and a polyfunctional hydroxy compound, said dicarboxylic acid comprising 0–80 mol % of terephthalic acid and 20–100 mol % of isophthalic acid, said dihydroxy compound component comprising 10–95 mol % of ethylene glycol and 5–90 mol % of 1,3-bis(2-hydroxyethoxy)benzene, and said polyfunctional hydroxy compound having at least three hydroxyl groups and being used in an amount of 0.05–1.0 part by mol based on 100 parts by mol of the dicarboxylic acid, and are highly oriented so that the stretch index as defined above becomes not less than 130 cm.

The eleventh blow molded articles of the invention are characterized in that the blow molded articles are composed of a polyester resin composition comprising [A] 95–99% by weight of a polyethylene terephthalate resin and [B] 1–5% by weight of a copolyester formed by esterification of dicarboxylic acid with a dihydroxy compound component, said dicarboxylic acid comprising 0–80 mol % of terephthalic acid and 20–100 mol % of isophthalic acid, and said dihydroxy compound component comprising 5–90 mol % of 1,3-bis(2-hydroxyethoxy)benzene or 1,4-bis(hydroxyethoxy)benzene and 10–95 mol % of ethylene glycol, and are highly oriented so that the stretch index as defined above becomes more than 130 cm.

The twelfth blow molded articles of the invention are characterized in that the blow molded articles are composed of a polyester resin composition comprising [A] 30–99% by weight of a polyethylene terephthalate resin and [B] 1–70% by weight of copolyesters formed by esterification of dicarboxylic acid with ethylene glycol, said dicarboxylic acid comprising 10–92 mol % of terephthalic acid and 8–90 mol % of isophthalic acid, and are highly oriented so that the orientation index as defined above becomes more than 130 cm.

The thirteenth blow molded articles of the invention are characterized in that the blow molded articles are composed of a polyester resin composition comprising [A] 80–99% by weight of a polyethylene terephthalate resin and [B] 5–20% by weight of a copolyester formed by esterification of dicarboxylic acid with a dihydroxy compound component and a polyfunctional hydroxy compound, said dicarboxylic acid comprising 0–80 mol % of terephthalic acid and 20–100 mol % of isophthalic acid, said dihydroxy compound component comprising 10–95 mol % of ethylene glycol and 5–90 mol % of 1,3-bis(2-hydroxyethoxy)benzene, and said polyfunctional hydroxy compound having at least three hydroxyl groups and being used in an amount of 0.05–1.0 part by mol based on 100 parts by mol of the dicarboxylic acid, and are highly oriented so that the stretch index as defined above becomes not less than 130 cm.

The fourteenth blow molded articles of the invention are characterized in that the blow molded articles are composed of a polyester resin composition comprising [A] a polyethylene terephthalate resin and [B] at least one polyester resin selected from the group consisting of (i) a polyethylene naphthalate resin, (ii) a polyethylene isophthalate resin, (iii) a copolyester formed by esterification of dicarboxylic acid containing terephthalic acid and 2,6-naphthalenedicarboxylic acid with ethylene glycol, (iv) a copolyester formed by esterification of terephthalic acid with a dihydroxy compound component containing ethylene glycol and cyclohexanedimethanol, (v) a copolyester formed by esterification of terephthalic acid with a dihydroxy compound component containing ethylene glycol and neopentyl glycol, (vi) a copolyester formed by esterification of terephthalic acid with a dihydroxy compound component containing ethylene glycol and diethylene glycol, and (vii) a copolyester formed by esterification of dicarboxylic acid containing terephthalic acid and an aliphatic dicarboxylic acid of 6–10 carbon atoms with ethylene glycol, and are highly oriented so that the stretch index as defined above becomes not less than 130 cm.

Figure 1:
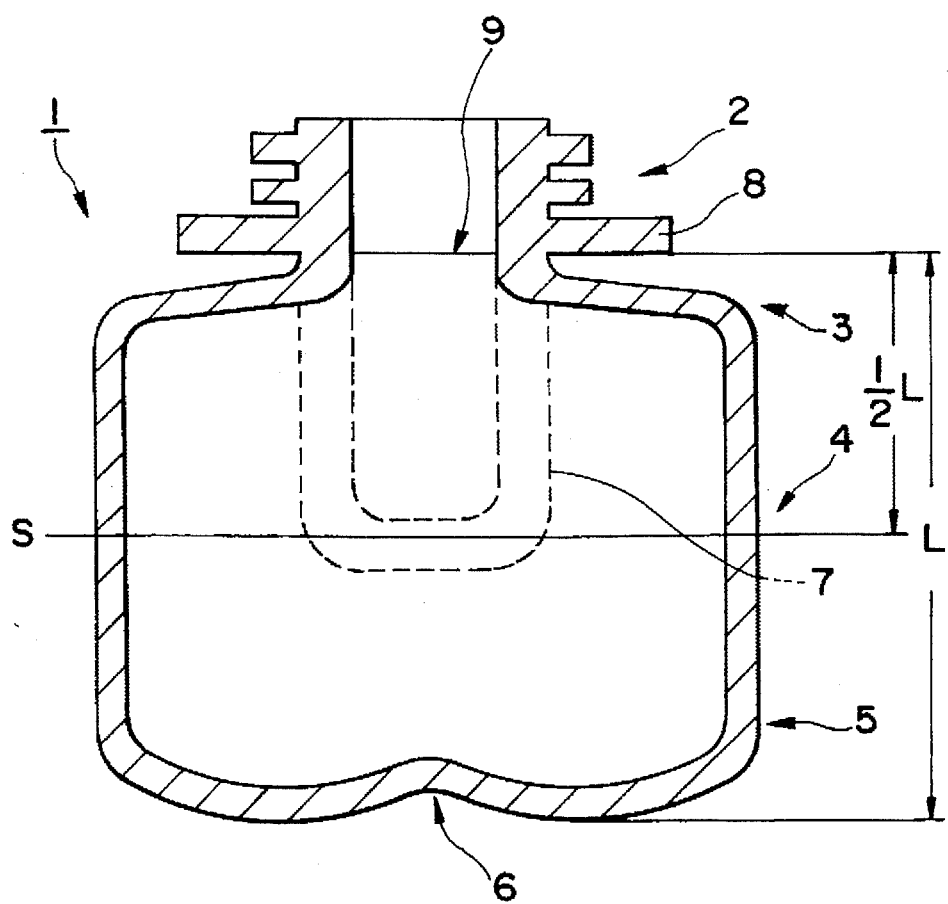
FIG. 1 is a rough sketch illustrative of the blow molded article of the present invention.

| 1 | Blow molded article | 2 | Stopper portion |
| 3 | Upper shoulder portion | 4 | Body portion |
| 5 | Lower shoulder portion | 6 | Bottom portion |

DETAILED DESCRIPTION OF THE INVENTION

The blow molded articles of the present invention are illustrated below in detail. First, copolyesters and polyester resin compositions from which the blow molded articles are formed are illustrated hereinafter.

Copolyester

The first blow molded articles of the present invention are formed from a copolyester obtained by esterification of dicarboxylic acid with a dihydroxy compound component and a polyfunctional hydroxy compound.

In the copolyesters as illustrated above, the carboxylic acid used comprises 0–80 mol %, preferably 0.5–50 mol % and especially 2–50 mol % of terephthalic acid and 20–100 mol %, preferably 50–99.5 mol % and especially 50–98 mol % of isophthalic acid, and the dihydroxy compound component used comprises 10–95 mol %, preferably 15–90 mol % of ethylene glycol and 5–90 mol %, preferably 10–85 mol % of 1,3-bis(2-hydroxyethoxy)benzene.

Further, the polyfunctional hydroxy compound used has at least three hydroxyl groups and used in an amount of 0.05–1.0 part by mol, preferably 0.1–0.5 part by mol based on 100 parts by mol of the dicarboxylic acid.

When blow molded articles are prepared from copolyesters obtained by reacting dicarboxylic acid with a dihydroxy compound component and a polyfunctional hydroxy compound in the proportions as defined above, the resulting blow molded articles are found to have such advantages that they are excellent in gas barrier properties and transparency, favorable in moldability with no irregularity in thickness and small in shrinkage factor.

Examples of the polyfunctional hydroxy compound used preferably include trimethylolmethane, trimethylolethane and trimethylolpropane, and of these compounds, preferred is trimethylolpropane.

The above-mentioned copolyesters desirably have an intrinsic viscosity [η], as measured in o-chlorophenol at 25° C., of 0.5–1.5 dl/g, preferably 0.6–1.2 dl/g and especially 0.8–0.85 dl/g.

The above-mentioned copolyesters and such copolyesters as will be mentioned later may be prepared in accordance with the known polycondensation techniques employed conventionally in preparing polyethylene terephthalate. The dicarboxylic acid may be fed, as such, to the reaction system, or may be fed in the form of dialkyl ester or diol ester thereof.

Further, the dihydroxy compound component may be fed, as such, to the reaction system, or may be fed in the form of dihydroxy ester of carboxylic acid.

Catalysts used in the above-mentioned polycondensation may be those conventionally used in preparing polyethylene terephthalate. These catalysts used include metals such as antimony, germanium and titanium, or compounds thereof. The compounds of these metals used as the catalysts may be in the form of an oxide, hydroxide, halide, inorganic acid salt, organic acid salt, complex salt, double salt, alcoholate or phenolate. These catalysts may be used either singly or in admixture of two or more. The catalysts may be fed to the reaction system at the initial stage of esterification reaction or ester interchange reaction, or may be fed to the reaction system before said initial stage moves to the stage of polycondensation reaction.

At the time when the polycondensation is initiated, there may be used various additives such as catalysts for ester interchange reaction used at the time of preparing polyethylene terephthalate, inhibitors for diethylene glycol formation, heat stabilizers, light stabilizers, lubricants, pigments and dyes.

The catalysts for ester interchange reaction used herein include metallic compounds of calcium, magnesium, lithium, zinc, cobalt or manganese, and these metallic compounds may be in the form of an oxide, hydroxide, halide, inorganic acid salt or organic acid salt. The inhibitors for diethylene glycol formation include amines such as triethylamine and tri-n-butylamine, and quaternary ammonium compounds such as tetraethylammonium hydroxide and tetrabutylammonium hydroxide. The heat stabilizers include phosphoric acid, phosphorous acid, hypophosphorous acid or phosphorus compounds such as esters thereof.

The copolyesters used in the invention may be prepared by the known melt polycondensation techniques, or may be prepared, under certain circumstances, by the solid phase polycondensation of the melt polycondensation techniques.

In the melt polycondensation as mentioned above, there may also be employed the so-called direct polycondensation technique or the so-called ester interchange polycondensation technique. That is, the melt copolycondensation may be carried out, for example, by a process wherein a condensate of terephthalic acid and isophthalic acid, or dicarboxylic acid consisting essentially of these acids, or ester derivative thereof with ethylene glycol, 1,3-bis(2-hydroxyethoxy)benzene, polyfunctional hydroxy compound or a condensate thereof with the dicarboxylic acid is allowed to undergo, either at a time or successively, esterification or ester interchange reaction, preferably at 100°–280° C., to form the initial polycondensate thereof, and the initial polycondensate thus formed is then allowed to undergo polycondensation reaction at a temperature higher than the melting point of said initial polycondensate, preferably at 200°–300° C., in vacuo or in an inert gas stream under agitation.

The copolyesters used in the invention may also be prepared by subjecting the copolyester obtained by the melt polycondensation technique further to solid phase polycondensation and thereby increasing the molecular weight of the resulting copolyester. The solid phase polycondensation may be carried out, for example, by a process wherein the copolyester obtained by the melt polycondensation is divided into fine particles which are then maintained at a temperature below the melting point of the copolyester, preferably 180°–240° C. in vacuo or in an inert gas stream.

The second blow molded articles of the invention are composed of a copolyester obtained by esterification of dicarboxylic acid with a dihydroxy compound component and a polyfunctional hydroxy compound. In the copolyesters as illustrated above, the dicarboxylic acid used comprises 85–99 mol %, preferably 90–99 mol % of terephthalic acid and 1–15 mol %, preferably 1–10 mol % of isophthalic acid, and the dihydroxy compound component used comprises 80–99 mol %, preferably 85–99 mol % of ethylene glycol and 1–20 mol %, preferably 1–15 mol % of 1,3-bis(2-hydroxyethoxy)benzene.

Further, the polyfunctional hydroxy compound used has at least three hydroxyl groups and used in an amount of 0.05–0.3 part by mol, preferably 0.05–0.2 part by mol based on 100 parts by mol of the dicarboxylic acid.

The copolyesters mentioned above desirably have an intrinsic viscosity [η], as measured in o-chlorophenol at 25° C., of 0.5–1.5 dl/g, preferably 0.6–1.2 dl/g.

In preparing the above-mentioned copolyesters, there may be used, in addition to terephthalic acid and isophthalic acid mentioned above, other dicarboxylic acids in such an amount that characteristics of the resulting copolyester are not marred, for example, not more than 1 mol %. The other dicarboxylic acids usable herein include phthalic acid, 2-methylterephthalic acid, 2,6-naphthalenedicarboxylic acid, etc.

In addition to ethylene glycol and 1,3-bis(2-hydroxyethoxy)benzene used in the invention as the dihydroxy compounds, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclohexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The third blow molded articles of the invention are formed from a copolyester obtained by esterification of dicarboxylic acid with a dihydroxy compound component.

In the copolyesters mentioned above, the dicarboxylic acid comprises 0–80 mol %, preferably 0–50 mol % of terephthalic acid and 20–100 mol %, preferably 50–100 mol % of isophthalic acid, and the dihydroxy compound component comprises 5–90 mol/%, preferably 10–85 mol % of 1,3-bis(2-hydroxyethoxy)benzene or 1,4-bis(2-hydroxyethoxy)benzene and 10–95 mol %, preferably 15–90 mol % of ethylene glycol.

The above-mentioned copolyesters desirably have an intrinsic viscosity [η], as measured in o-chlorophenol at 25° C., of 0.5–1.5 dl/g, preferably 0.6–1.2 dl/g.

When blow molded articles are prepared from such copolyesters as mentioned above, the resulting blow molded articles are excellent in gas barrier properties and transparency, and also have excellent mechanical characteristics.

In preparing the above-mentioned copolyesters, there may also be used, in addition to terephthalic acid and isophthalic acid used as the dicarboxylic acid, other dicarboxylic acids, and there may also be used, in addition to 1,3-bis(2-hydroxyethoxy)benzene, 1,4-bis(2-hydroxyethoxy)benzene and ethylene glycol used as the dihydroxy compound component, other dihydroxy compounds.

The fourth blow molded articles of the invention are formed from a copolyester obtained by esterification of dicarboxylic acid with ethylene glycol.

In the copolyesters as obtained above, the dicarboxylic acid comprises 80–99.5 mol %, preferably 90–99.5 mol % of terephthalic acid and 0.5–20 mol %, preferably 0.5–10 mol % of 2,6-naphthalenedicarboxylic acid.

The above-mentioned copolyesters used in the invention desirably have an intrinsic viscosity [η], as measured in o-chlorophenol at 25° C., of 0.5–1.5 dl/g, preferably 0.6–1.2 dl/g.

The copolyesters as illustrated above are excellent in gas barrier properties and transparency, and also excellent in moldability or stretchability.

In preparing the above-mentioned copolyesters, there may also used, in addition to terephthalic acid and 2,6-naphthalenedicarboxylic acid used as the dicarboxylic acids, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, etc.

In addition to ethylene glycol used as the dihydroxy compound component in preparing the copolyesters mentioned above, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-5-hydroxyethoxyphenyl)sulfone.

The fifth blow molded articles of the invention are formed from a copolyester obtained by esterification of dicarboxylic acid with ethylene glycol.

In the copolyesters as mentioned above, the dicarboxylic acid comprises 80–99.5 mol %, preferably 90–99.5 mol % of terephthalic acid and 0.5–15 mol %, preferably 0.5–10 mol % of isophthalic acid.

The above-mentioned copolyesters used in the invention desirably have an intrinsic viscosity [η], as measured in o-chlorophenol at 25° C., of 0.5–1.5 dl/g, preferably 0.6–1.2 dl/g. The copolyesters having this intrinsic viscosity of 0.5–1.5 dl/g are excellent in mechanical strength and also in melt moldability.

In preparing the above-mentioned copolyesters, there may also be used, in addition to terephthalic acid and isophthalic acid used as the dicarboxylic acid, other dicarboxylic acids in such an amount that no characteristics of the resulting copolyester are marred, for example, not more than 1 mol %. The other dicarboxylic acids usable herein include phthalic acid, 2-methylterephthalic acid, 2,6-naphthalenedicarboxylic acid, etc.

In addition to ethylene glycol used as the dihydroxy compound component, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, cyclohexanedimethanol, 1,3bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The sixth blow molded articles of the invention are formed from a copolyester obtained by esterification of dicarboxylic acid with ethylene glycol.

In the copolyesters as mentioned above, the dicarboxylic acid comprises 85–99.5 mol %, preferably 90–99.5 mol % of terephthalic acid and 0.5–15 mol %, preferably 0.5–10 mol % of aliphatic dicarboxylic acid of 6–10 carbon atoms.

Examples of the aliphatic dicarboxylic acid used include adipic acid, sebacic acid, etc.

These aliphatic dicarboxlic acid may also be used as a mixture thereof.

Of these aliphatic dicarboxylic acids, particularly preferred is adipic acid or sabacic acid.

When the amount of the aliphatic dicarboxylic acid of 6–10 carbon atoms used is 0.5–15 mol %, the resulting copolyester is excellent in transparency and also excellent in moldability or stretchability.

In preparing the above-mentioned copolyesters, there may also used, in addition to terephthalic acid and aliphatic dicarboxylic acid used as the dicarboxylic acid, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, 2,6-dinaphthalenedicarboxylic acid, etc.

In addition to ethylene glycol used as the dihydroxy compound component, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, cyclohexanedimethanol, 1,3-bis(2-hydroxyethoxy)benzene, 1,4-bis (2-hydroxyethoxy) benzene, 2,2-bis (4-β-hydroxyethoxyphenyl)propane and bis(4-β-hydroxyethoxyphenyl)sulfone.

The above-mentioned copolyesters desirably have an intrinsic viscosity [η], as measured in o-chlorophenol at 25° C., of 0.5–1.5 dl/g, preferably 0.6–1.2 dl/g. The copolyesters having this intrinsic viscosity [η] of 0.5–1.5 are excellent in mechanical strength and also in melt moldability.

The seventh blow molded articles of the invention are formed from a copolyester obtained by esterification of terephthalic acid with a dihydroxy compound component.

In the copolyesters as obtained above, the dihydroxy compound component comprises 85–99.5 mol %, preferably 90–99.5 mol % of ethylene glycol and 0.5–15 mol %, preferably 0.5–10 mol % of neopentyl glycol.

In preparing the above-mentioned copolyesters, there may also be used, in addition to terephthalic acid used as the dicarboxylic acid, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, 2,6-naphthalenedicarboxylic acid, etc.

In addition to ethylene glycol and neopentyl glycol used as the dihydroxy compound component in preparing the above-mentioned copolyesters, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, cyclochexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The above-mentioned copolyesters used in the invention desirably have an intrinsic viscosity [η], as measured in o-chlorophenol at 25° C., of 0.5–1.5 dl/g, preferably 0.6–1.2 dl/g. The copolyesters having this intrinsic viscosity [η] of 0.5–1.5 dl/g are excellent in mechanical strength and also excellent in melt moldability.

The eighth blow molded articles of the invention are formed from a copolyester obtained by esterification of terephthalic acid with a dihydroxy compound component.

In the copolyesters as obtained above, the dihydroxy compound component comprises 85–99.5 mol %, preferably 90–99.5 mol % of ethylene glycol and 0.5–15 mol %, preferably 0.5–10 mol % of cyclohexanedimethanol.

In preparing the above-mentioned copolyesters, there may also be used, in addition to terephalic acid used as the dicarboxylic acid, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, 2,6-naphtalenedicarboxylic acid, etc.

In addition to ethylene glycol and cyclohexanedimethanol used as the dihydroxy compound component in preparing the above-mentioned copolyesters, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, 1,3-bis(2-hydroxyethoxy)

benzene, 1,4-bis(2-hydroxyethoxy)benzene, 2,2-bis(4-β-hydroxyethoxyphenyl)propane and bis(4-β-hydroxyethoxyphenyl)sulfone.

The above-mentioned copolyesters used in the invention desirably have an intrinsic viscosity [η], as measured in o-chlorophenol at 25° C., of 0.5–1.5 dl/g, preferably 0.6–1.2 dl/g. The copolyesters having this intrinsic viscosity [η] of 0.5–1.5 dl/g are excellent in mechanical strength and also excellent in melt moldability.

The ninth blow molded articles of the invention are formed from a copolyester obtained by esterification of terephthalic acid with a dihydroxy compound component.

In the copolyesters as obtained above, the dihydroxy compound component comprises 93–98 mol %, preferably 95–98 mol % of ethylene glycol and 2–7 mol %, preferably 2–5 mol % of diethylene glycol.

In preparing the above-mentioned copolyesters, there may also used, in addition to terephthalic acid used as the dicarboxylic acid, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, 2,6-naphtalenedicarboxylic acid, etc.

In addition to ethylene glycol and diethylene glycol used as the dihydroxy compound component in preparing the above-mentioned copolyesters, there may be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The above-mentioned copolyesters used in the invention desirably have an intrinsic viscosity [η], as measured in o-chlorophenol at 25° C., of 0.5–1.5 dl/g, preferably 0.6–1.2 dl/g. The copolyesters having this intrinsic viscosity [η] of 0.5–1.5 dl/g are excellent in mechanical strength and also excellent in melt moldability.

The tenth blow molded articles of the invention are formed from a polyester resin composition containing [A] 95–99% by weight, preferably 96–98% by weight of a polyethylene terephthalate resin and [B] 1–5% by weight, preferably 2–4% by weight of the copolyester used in the first blow molded articles of the invention, said copolyester being obtained by esterification of dicarboxylic acid with a dihydroxy compound component and a polyfunctional hydroxy compound, said dicarboxylic acid comprising 0–80 mol %, preferably 0.5–50 mol % and especially 2–50 mol % of terephthalic acid and 20–100 mol %, preferably 50–99.5 mol % and especially 50–98 mol % of isophthalic acid, said dihydroxy compound component comprising 10–95 mol %, preferably 15–90 mol % of ethylene glycol and 5–90 mol %, preferably 10–85 mol % of 1,3-bis(2-hydroxyethoxy)benzene, and said polyfunctional hydroxy compound having at least three hydroxyl groups and being used in an mount of 0.05–1.0 part by mol, preferably 0.1–0.5 part by mol based on 100 parts by mol of the dicarboxylic acid.

The above-mentioned copolyesters desirably have an intrinsic viscosity [η], as measured in o-chlorophenol at 25° C., of 0.5–1.5 dl/g, preferably 0.6–1.2 dl/g.

The polyethylene terephthalate resin [A] contained in the above-mentioned polyester resin compositions is a polyester containing ethylene terephalate units as the main structural units.

The polyethylene terephthalate resin desirably contains usually not less than 50 mol %, preferably not less than 70 mol % of the ethylene terephthalate structural units. The polyethylene terephthalate resin containing such ethylene terephthalate structural units as mentioned above is composed of diol component units and dicarboxylic acid component units. The dicarboxylic acid component units which the polyethylene terephthalate resin comprises may contain, in addition to the terephthalic acid component units, small amounts of other aromatic dicarboxylic acid component units. Such aromatic dicarboxylic acid component units include, for example, component units derived from isophthalic acid, phthalic acid, naphthalenedicarboxylic acid, 2,6-naphthalenedicarboxylic acid, etc.

In the ethylene terephthalate units which the polyethylene terephthalate resin comprises, there are present the terephthalic acid component units in an amount of usually 50–100 mol %, preferably 70–100 mol %, the aromatic dicarboxylic acid component units other than the terephthalic acid component units in an amount of usually 0–50 mol %, preferably 0–30 mol %, the ethylene glycol component units, i.e. the diol component units, in an amount of usually 50–100 mol %, preferably 70–100 mol %, the diol component units other than ethylene glycol component units in an amount of usually 0–50 mol %, preferably 0–30 mol %, and the polyfunctional compound component units in an amount of usually 1–2 mol %, preferably 0–1 mol %.

The above-mentioned polyethylene terephthalate resin desirably has an intrinsic viscosity [η] (as measured in a 1:1 by weight mixed solvent of phenol and tetrachloroethane) of usually 0.5–1.5 dl/g, preferably 0.6–1.2 dl/g, a melting point of usually 210°–265° C., preferably 220°–260° C., and a glass transition temperature of usually 50°–120° C., preferably 60°–100° C.

The polyester resin compositions containing the above-mentioned polyethylene terephthalate resin [A] and copolyester resin [B] in the proportions as defined above are excellent in gas barrier properties and moldability, while being freed from deterioration in transparency and mechanical properties owned by the polyethylene terephthalate used therein.

The above-mentioned polyester resin compositions and the polyester resin compositions as will be mentioned later may be prepared by mixing the polyethylene terephthalate resin with the copolyester resin using a mixing equipment such as a Henschel mixer, V blender, ribbon blender and tumbler blender, followed by melt mixing the resulting mixture using a single screw extruder, double-screw extruder, kneader or Banbury mixer, or by pulverizing said mixture.

The copolyester and polyester resin compositions used for preparing blow molded articles in the invention may be incorporated with various additives commonly added to polyester such as heat stabilizers, weathering agents, antistatic agents, slip agents, releasing agents, pigment dispersion agents, pigments or dyes in such an amount that no hindrances are thrown in the way of accomplishing the objects of the invention.

The eleventh blow molded articles of the invention are formed from a polyester resin composition containing [A] 95–99% by weight, preferably 96–98% by weight of a polyethylene terephthalate resin and [B] 1–5% by weight, preferably 2–4% by weight of the copolyester used in the third blow molded articles of the invention formed by esterification of dicarboxylic acid with a dihydroxy compound component, said dicarboxylic acid comprising 0–80 mol %, preferably 0–50 mol % of terephthalic acid and 20–100 mol %, preferably 50–100 mol % of isophthalic acid, and said dihydroxy compound component comprising 5–90 mol %, preferably 10–85 mol % of 1,3-bis(2-hydroxyethoxy)benzene or 1,4-bis(2-hydroxyethoxy)benzene and 10–95 mol %, preferably 15–90 mol % of ethylene glycol.

The polyethylene terephthalate resin used herein is the same as used in the tenth blow molded articles of the invention.

The above-mentioned copolyester desirably has an intrinsic viscosity [η], as measured in o-chlorophenol at 25° C., of 0.5–1.5 dl/g, preferably 0.6–1.2 dl/g.

The polyester resin compositions containing the above-mentioned polyethylene terephthalate resin [A] and copolyester [B] in the proportions as defined above are excellent in gas barrier properties and moldability while being freed from deterioration in transparency and mechanical properties owned by the polyethylene terephthalate used therein.

The twelfth blow molded articles of the invention are formed from a polyester resin composition containing [A] 30–99% by weight, preferably 30–98% by weight and especially 30–97% by weight of a polyethylene terephthalate resin and [B] 1–70% by weight, preferably 2–70% by weight and especially 3–70% by weight of copolyester formed by esterification of dicarboxylic acid with ethylene glycol, said dicarboxylic acid comprising 10–92 mol %, preferably 50–92 mol % and especially 80–92 mol % of terephthalic acid and 8–90 mol %, preferably 8–50 mol % and especially 8–20 mol % of isophthalic acid.

The polyethylene terephthalate resin [A] used herein is the same as used in the tenth blow molded articles of the invention.

In preparing the above-mentioned copolyester, there may also be used, in addition to terephthalic acid and isophthalic acid used as the dicarboxylic acid, other dicarboxylic acids in such an amount that no characteristics of the resulting copolyester are marred, for example, not more than 1 mol %. The other dihydroxy compounds usable herein include phthalic acid, 2-methylterephthalic acid, 2,6-naphthalenedicarboxylic acid, etc.

In addition to ethylene glycol used as the dihydroxy compound in preparing the above-mentioned copolyester, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The above-mentioned copolyester used in the invention desirably has an intrinsic viscosity [η], as measured in o-chlorophenol at 25° C., of 0.5–1.5 dl/g, preferably 0.6–1.2 dl/g. The copolyester having this intrinsic viscosity [η] of 0.5–1.5 dl/g is excellent in mechanical strength and also excellent in melt moldability.

The polyester resin compositions containing the above-mentioned polyethylene terephthalate resin [A] and copolyester [B] in the proportions as defined above are excellent in gas barrier properties and moldability while being freed from deterioration in transparency and mechanical properties owned by the polyethylene terephalate used therein.

The thirteenth blow molded articles of the invention are formed from a polyester resin composition containing [A] 80–95% by weight, preferably 85–93% by weight of a polyethylene terephthalate resin and [B] 5–20% by weight, preferably 7–15% by weight of the copolyester used in the first blow molded articles of the invention formed by esterification of dicarboxylic acid with a dihydroxy compound component and a polyfunctional hydroxy compound, said dicarboxylic acid comprising 0–80 mol %, preferably 0.5–50 mol % and especially 2–50 mol % of terephthalic acid and 20–100 mol %, preferably 50–99.5 mol % and especially 50–98 mol % of isophthalic acid, said dihydroxy compound component comprising 10–95 mol %, preferably 15–90 mol % of ethylene glycol and 5–90 mol %, preferably 10–85 mol % of 1,3-bis(2-hydroxyethoxy)benzene, and said polyfunctional hydroxy compound having at least three hydroxyl groups and being used in an amount of 0.05–1.0 part by mol based on 100 parts by mol of the dicarboxylic acid.

The polyethylene terephthalate resin [A] used herein is the same as used in the tenth blow molded articles of the invention.

The fourteenth blow molded articles of the invention are formed from a polyester resin composition containing [A] a polyethylene terephthalate resin and [B] at least one polyester resin selected from the group consisting of (i) a polyethylene naphthalate resin, (ii) a polyethylene isophthalate resin, (iii) a copolyester formed by esterification of dicarboxylic acid containing terephthalic acid and 2,6-naphthalenedicarboxylic acid with ethylene glycol, (iv) a copolyester formed by esterification of terephthalic acid with a dihydroxy compound component containing ethylene glycol and cyclohexanedimethanol, (v) a copolyester formed by esterification of terephthalic acid with a dihydroxy compound component containing ethylene glycol and neopentyl glycol, (vi) copolyesters formed by esterification of terephthalic acid with a dihydroxy compound component containing ethylene glycol and diethylene glycol, and (vii) a copolyester formed by esterification of dicarboxylic acid containing terephthalic acid and aliphatic dicarboxylic acid of 6–10 carbon atoms with ethylene glycol.

The polyethylene terephthalate resin [A] used herein is the same as used in the tenth blow molded articles of the invention.

The polyester resin [B] used, together with the above-mentioned polyethylene terephthalate resin [A], in the above-mentioned fourteenth blow molded articles of the invention is selected from the group consisting of the resins and copolyesters mentioned below.

(i) Polyethylene naphthalate resin

The polyethylene naphthalate resin used in the invention desirably contains not less than 60 mol %, preferably not less than 80 mol % and especially not less than 90 mol % of ethylene-2,6-naphthalate units derived from 2,6-naphthalenedicarboxylic acid and ethylene glycol, and may contain less than 40 mol % of structural units other than ethylene-2,6-naphthalate.

The structural units other than ethylene-2,6-naphthalate include those derived from aromatic dicarboxylic acids such as terephthalic acid, isophthalic acid, 2,7-naphthalene dicarboxylic acid, 2,5-naphthalenedicarboxylic acid, diphenyl-4,4'-dicarboxylic acid, 4,4'-diphenyletherdicarboxylic acid, 4,4'-diphenylsulfone-dicarboxylic acid, 4,4-diphenoxyethanedicarboxylic acid and dibromoterephthalic acid; aliphatic dicarboxylic acids such as adipic acid, azelaic acid, sebacic acid and decanedicarboxylic acid; alicyclic dicarboxylic acids such as 1,4-cyclohexanedicarboxylic acid, cyclopropanedicarboxylic acid and hexahydroterephthalic acid; hydroxycarboxylic acids such as glycolic acid, p-hydroxybenzoic acid and p-hydroxyethoxybenzoic acid; propylene glycol, trimethylene glycol, diethylene glycol, tetramethylene glycol, pentamethylene glycol, hexamethylene glycol, decamethylene glycol, neopentyl glycol, p-xylene glycocl, 1,4-cyclohexane dimethanol, bisphenol A, p,p-diphenoxysulfone, 1,4-bis(β-hydroxyethoxy)benzene, 2,2-bis(p-β-hydroxyethoxyphenyl)propane, polyalkylene glycol, p-phenylenebis(dimethylsiloxane) and glycerin.

Further, the polyethylene naphthalate resin used in the invention may contain small amounts, for example, not more than 2 mol % of structural units derived from polyfunctional compounds such as trimesic acid, trimethylolethane, trimethylolpropane, trimethylolmethane and pentaerythritol.

Furthermore, the polyethylene naphthalate resin used in the invention may contain small amounts, for example, not more than 2 mol % of structural units derived from monofunctional compounds such as benzoylbenzoic acid, diphenylsulfonemonocarboxylic acid, stearic acid, methoxypolyethylene glycol and phenoxypolyethylene glycol.

The polyethylene naphthalate resin as illustrated above is substantially linear in structure, and this can be confirmed by the fact that said polyethylene naphthalate resin dissolves in o-chlorophenol.

The intrinsic viscosity [η], as measured in o-chlorophenol at 25° C., of the polyethylene naphthalate is desirably 0.2–1.1 dl/g, preferably 0.3–0.9 dl/g and especially 0.4–0.8 dl/g.

The intrinsic viscosity [η] of polyethylene naphthalate is determined by the following procedure. That is, polyethylene naphthalate is dissolved at a concentration of 1 g/100 ml in o-chlorophenol to measure the viscosity of the resulting solution by means of a Ubbellhode viscometer, then o-chlorophenol is gradually added to said solution to measure the viscosity of the resulting solution at a lower concentration side, and the two viscosities thus measured are extrapolated to 0% concentration to obtain an intrinsic viscosity ([η]).

The heat-up crystallizing temperature (Tc) of polyethylene naphthalate when heated at a rate of 10° C./min by means of a differential scanning calorimeter (DSC) is usually more than 150° C., preferably 160°–230° C. and especially 170°–220° C.

The heat-up crystallizing temperature (Tc) of polyethylene naphthalate is determined by the following procedure. That is, a polyethylene naphthalate chip is dried for not less than about 5 hours at about 140° C. and a pressure of about 5 mmHg using DSC-2 Model differential scanning calorimeter manufactured by Perkin Elmer Co., Ltd. A thin specimen of about 10 mg is taken out of the center portion of the dried chip, and the specimen is encapsulated in an aluminum pan for liquid in a nitrogen atmosphere to carry out the measurement. The aluminum pan is raised in temperature rapidly from room temperature, and the molten specimen is kept therein at 290° C. for 10 minutes. The aluminum pan is then cooled rapidly to room temperature, and thereafter the aluminum pan is heated at a rate of 10° C./min to obtain an apex temperature of exothermic peak detected at that time.

In the polyester resin compositions containing the above-mentioned polyethylene naphthalate resin and polyethylene terephthalate resin, the former resin is used in an amount of 0.5–20% by weight, preferably 0.5–15% by weight, and the latter is used in an mount of 80–99.5% by weight, preferably 85–99.5% by weight.

(ii) Polyethylene isophthalate resin

The polyethylene isophthalate resin used in the invention is polyester containing ethylene isophthalate units as the main structural units.

The content of the ethylene isophthalate units in the polyethylene isophthalate resin is usually not less than 50 mol %, preferably not less than 70 mol %. The polyethylene isophthalate resin containing such ethylene isophthalate structural units as mentioned above is composed of diol component units and dicarboxylic acid component units. The dicarboxylic acid component units constituting the polyethylene isophthalate resin may contain small amounts of other aromatic dicarboxylic acid component units in addition to the isophthalic acid component units. Such aromatic dicarboxylic acid component units include, for example, component units derived from isophthalic acid, phthalic acid, naphthalenedicarboxylic acid and 2,6-naphthalenedicarboxylic acid.

In the ethylene isophthalate units which the polyethylene isophthalate resin comprises, there are present the isophthalic acid component units in an amount of usually 50–100 mol %, preferably 70–100 mol %, the aromatic dicarboxylic acid component units other than the isophthalic acid component units in an amount of usually 0–50 mol %, preferably 0–30 mol %, the ethylene glycol component units, i.e. the diol component units, in an amount of usually 50–100 mol %, preferably 70–100 mol %, the diol component units other than the ethylene glycol units in an amount of usually 0–50 mol %, preferably 0–30 mol %, and the polyfunctional compound component units in an amount of usually 1–2 mol %, preferably 0–1 mol %.

The above-mentioned polyethylene isophthalate resin desirably has an intrinsic viscosity [η] (as measured in a mixed solvent (weight ratio 1/1) of phenol and tetrachloroethane) of usually 0.5–1.5 dl/g, preferably 0.6–1.2 dl/g, a melting point of usually 210°–265° C., preferably 220°–260° C., and a glass transition temperature of usually 50°–120° C., preferably 60°–100° C.

In the polyester resin compositions containing the above-mentioned polyethylene isophthalate resin and polyethylene terephthalate resin, the latter resin is used in an amount of 85–99.5% by weight, preferably 90–99.5% by weight and the former is used in an amount of 0.5–15% by weight, preferably 0.5–10% by weight.

(iii) Copolyester

The copolyester (iii) is obtained by cocondensation reaction of dicarboxylic acid including terephthalic acid and 2,6-naphthalenedicarboxylic acid with ethylene glycol.

In preparing the above-mentioned copolyester, there may also be used, in addition to the above-mentioned terephthalic acid and 2,6-naphthalenedicarboxylic acid used as the dicarboxylic acid, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, etc.

In addition to ethylene glycol used as the dihydroxy compound component at the time of preparing the copolyester, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The copolyester as illustrated above desirably has an intrinsic viscosity [η], as measured in o-chlorophenol at 25° C., of 0.5–1.5 dl/g, preferably 0.6–1.2 dl/g.

In the polyester resin composition obtained by blending of the above-mentioned copolyester and polyethylene terephthalate resin, it is desirable that said copolyester is formed by esterification of terephthalic acid and 2,6-naphthalenedicarboxylic acid with ethylene glycol in such amounts that the structural units derived from 2,6-naphthalenedicarboxylic acid becomes 0.5–20 mol %, preferably 0.5–10 mol % based on the structural units derived from all the dicarboxylic acid, and is blended with said polyethylene terephthalate resin.

(iv) Copolyester

The copolyester (iv) is obtained by the following cocondensation reaction of terephthalic acid with ethylene glycol and a dihydroxy compound component including cyclohexanedimethanol.

In preparing the above-mentioned copolyester, there may also be used, in addition to the above-mentioned terephthalic acid used as the dicarboxylic acid, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, 2,6-naphthalenedicarboxylic acid, etc.

In addition to ethylene glycol and cyclohexane dimethanol used as the dihydroxy compounds at the time of preparing the copolyester, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclohexanediol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The above-mentioned copolyester used in the invention desirably has an intrinsic viscosity [η], as measured in o-chlorophenol at 25° C., of 0.5–1.5 dl/g, preferably 0.6–1.2 dl/g.

In the polyester resin composition obtained by blending of the above-mentioned copolyester and polyethylene terephthalate resin, it is desirable that said copolyester is formed by esterification of terephthalic acid with the dihydroxy compounds including ethylene glycol and cyclohexane dimethanol in such amounts that the structural units derived from cyclohexanedimethanol becomes 0.5–15 mol %, preferably 0.5–10 mol % based on the structural units derived from all the dihydroxy compounds, and is blended with said polyethylene terephthalate resin.

(v) Copolyester

The copolyester (v) is obtained by cocondensation reaction of terephthalic acid with dihydroxy compounds including ethylene glycol and neopentyl glycol.

In preparing the above-mentioned copolyester, there may also be used, in addition to the above-mentioned terephthalic acid used as the dicarboxylic acid, other dicarboxylic acids in such an amount that no characteristics of the resulting copolyester are marred, for example, not more than 1 mol %. The other dicarboxylic acids usable herein include isophthalic acid, phthalic acid, 2-methylterephthalic acid, 2,6-naphthalenedicarboxylic acid, etc.

In addition to ethylene glycol and neopentyl glycol used as the dihydroxy compounds at the time of preparing the copolyester, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, cyclohexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The above-mentioned copolyester desirably has an intrinsic viscosity [η], as measured in o-chlorophenol at 25° C., of 0.5–1.5 dl/g, preferably 0.6–1.2 dl/g.

In the polyester resin composition obtained by blending the above-mentioned copolyester and polyethylene terephthalate resin, it is desirable that said copolyester is formed by esterification of terephthalic acid with the dihydroxy compounds including ethylene glycol and neopentyl glycol in such amounts that the structural units derived from neopentyl glycol becomes 0.5–15 mol %, preferably 0.5–10 mol % based on the structural units derived from all the dihydroxy compounds, and is blended with said polyethylene terephthalate resin.

(vi) Copolyester

The copolyester (vi) is obtained by cocondensation reaction of terephthalic acid with dihydroxy compounds including ethylene glycol and diethylene glycol.

In preparing the above-mentioned copolyester, there may also be used, in addition to terephthalic acid used as the dicarboxylic acid, other dicarboxylic acids in such an amount that no characteristics of the resulting copolyester are marred, no more than 1 mol %. The other dicarboxylic acids usable herein include isophthalic acid, phthalic acid, 2-methylterephthalic acid, 2,6-naphthalenedicarboxylic acid, etc.

In addition to ethylene glycol and diethylene glycol used as the dihydroxy compounds at the time of preparing the copolyester, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclohexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

The above-mentioned copolyester desirably has an intrinsic viscosity [η], as measured in o-chlorophenol at 25° C., of 0.5–1.5 dl/g, preferably 0.6–1.2 dl/g.

In the polyester resin composition obtained by blending of the above-mentioned copolyester and polyethylene terephthalate resin, it is desirable that said copolyester is formed by esterification of terephthalic acid with the dihydroxy compounds including ethylene glycol and diethylene glycol in such amounts that the structural units derived from diethylene glycol become 2–7 mol %, preferably 2–5 mol % based on the structural units derived from all the dihydroxy compounds, and is blended with said polyethylene terephthalate resin.

(vii) Copolyester

The copolyester (vii) is obtained by cocondensation reaction of dicarboxylic acid including terephthalic acid and aliphatic dicarboxylic acid of 6–10 carbon atoms with ethylene glycol.

The aliphatic dicarboxylic acid of 6–10 carbon atoms used herein includes concretely adipic acid, sebacic acid, etc.

These aliphatic dicarboxylic acids may be used as a mixture thereof.

Of these aliphatic dicarboxylic acids, particularly preferred is adipic acid or sebacic acid.

In preparing the above-mentioned copolyester, there may also be used, in addition to the above-mentioned terephthalic acid and aliphatic dicarboxylic acid of 6–10 carbon atoms used as the dicarboxylic acids, other dicarboxylic acids in such an amount that no characteristics of the resulting copolymer are marred, for example, not more than 1 mol %. The other dicarboxylic acids usable herein include isophthalic acid, phthalic acid, 2-methylterephthalic acid, 2,6-naphthalenedicarboxylic acid, etc.

In addition to ethylene glycol used as the dihydroxy compound at the time of preparing the above-mentioned copolyester, there may also be used other dihydroxy compounds in such an amount that no characteristics of the resulting copolyester are marred, for example, not more than 1 mol %. The other dihydroxy compounds usable herein are dihydroxy compounds of 3–15 carbon atoms such as 1,3-propanediol, 1,4-butanediol, neopentyl glycol, cyclochexanediol, cyclohexanedimethanol, 1,3-bis(2-hydroxyethoxy)benzene, 1,4-bis(2-hydroxyethoxy)benzene, 2,2-bis(4-β-hydroxyethoxyphenyl)propane and bis(4-β-hydroxyethoxyphenyl)sulfone.

In the polyester resin composition obtained by blending of the above-mentioned copolyester and polyethylene terephthalate resin, it is desirable that said copolyester is formed by esterification of dicarboxylic acid including terephthalic acid and aliphatic dicarboxylic acid of 6–10 carbon atoms with ethylene glycol in such amounts that the structural units derived from aliphatic dicarboxylic acid of 6–10 carbon atoms become 0.5–15 mol %, preferably 0.5–10 mol % based on the structural units derived from all the dicarboxylic acids, and is blended with said polyethylene terephthalate resin.

Blow molded article

The blow molded articles of the present invention are composed of the above-mentioned copolyester or polyester composition, and are highly oriented so that the stretch index as defined by the following equations becomes not less than 130 cm, preferably 140–220 cm and especially 150–200 cm.

$$\text{Stretch index} = \frac{\text{Internal volume (excluding stopper portion) of oriented bottle}}{\text{Internal volume (excluding stopper portion) of unoriented preform}} \times \frac{1}{f}$$

$$f = \frac{\text{Internal surface area (excluding stopper portion) of oriented bottle}}{\text{Internal volume (excluding stopper portion) of oriented bottle}} \; (\text{cm}^{-1})$$

The stretch index of the blow molded article of the invention is illustrated below with reference to the accompanying FIG. 1. The blow molded article 1 of the invention is composed, as shown in FIG. 1, of a stopper portion 2, an upper shoulder portion 3, a body 4, a lower shoulder portion 5 and a bottom portion 6.

In preparing such blow molded article 1 as mentioned above, a preform 7 is used, and this preform 7 is shown in FIG. 1 by means of a dotted line.

The internal volume of such oriented blow molded article as mentioned above is an internal volume of the oriented blow molded article 1 excluding the stopper portion 2, particularly, an internal volume of a portion below a support ring 8 of the blow molded article 1, and more particularly, said internal volume means an internal volume of a portion below an imaginary straight line 9 of the blow molded article.

The internal volume of the unoriented preform is an internal volume of the preform 7 excluding the stopper portion 2, particularly an internal volume of a portion below the support ring 8 of the preform 7, and more particularly said internal volume means an internal volume of a portion below the imaginary straight line 9 of the preform.

The internal surface area of the oriented blow molded article is an internal surface area excluding the stopper portion 2 of the oriented blow molded article 1, particularly an internal surface area of a portion below the support ring 8 of the oriented blow molded article 1, and more particularly said internal surface area means an internal surface area of a portion below the imaginary straight line 9 of the blow molded article.

The internal surface area S of the oriented blow molded article (excluding an internal surface area of the stopper portion) may be measured by the micro-division method wherein the blow molded article is divided, the profile of the internal surface area of the blow molded article is detected by means of the three-dimensional tester, and the blow molded article is divided into small portions, followed by integrating the surface area of the small portions thus divided. When the oriented blow molded article has a simple shape, the internal surface area thereof may also be obtained as an approximate value by assuming that the body of the blow molded article is a cylinder, and the lower and upper portions of the blow molded article are respectively a semisphere.

The above-mentioned stretch index of the oriented blow molded article may be calculated on the basis of the internal surface area and internal volume (excluding the stopper portion) of the oriented blow molded article and the internal volume of the unoriented blow molded article (excluding the stopper portion) as obtained. The internal volume of the blow molded article may be easily measured by placing a liquid such as water therein. The units of f value and orientation index are $cm^{-1}$ and cm, respectively.

In the blow molded article of the invention, the wall thickness of the body is similar to that of conventional blow molded articles, and is usually 0.1–0.5 mm, preferably 0.2–0.4 or thereabouts.

The process for preparing the blow molded article of the invention is illustrated below.

First, a preform is prepared from the above-mentioned copolyester, for example, by the methods, per se, known.

The preform used in the invention desirably has a length shorter than that of the prior art preform, because in the present process the portion to be oriented of the present preform is more highly oriented by far than the prior art preform. If necessary, the present preform may be molded shorter in diameter than the prior art preform.

In the process of the invention, the blow molded article is prepared by blow molding the preform for blow molded article as mentioned above.

In that case, the present preform is blow molded so that the resulting blow molded article has the stretch index as defined above of not less than 130 cm, preferably 140–220 cm and especially 150–200 cm.

The temperature employed at the time of blow molding the present preform is 80°–110° C., preferably 90°–105° C.

EFFECT OF THE INVENTION

The blow molded articles of the present invention are prepared by stretching specific copolyesters or polyester resin compositions both having a specific stretch ratio. Accordingly, they have excellent transparency and moldability as well as gas barrier properties, and they are also advantageous from the economical standpoint.

The present invention is illustrated below with reference to examples, but it should be construed that the present invention is in no way limited to those examples.

EXAMPLE 1

A dicarboxylic acid component composed of 99 mol % of terephthalic acid and 1 mol % of 2,6-naphthalenedicarboxylic acid was esterified with ethylene glycol by the prior art method to obtain a copolyester having an intrinsic viscosity [η] of 0.65 dl/g.

The thus obtained copolyester was molded by a molding machine (trade name of M-100A, manufactured by Meiki Seisakusho K.K.) to obtain a preform for forming a bottle. The molding temperature was 270° to 290° C.

The thus obtained preform was molded by a molding machine (trade name of LB-01, manufactured by Corpoplast Co., Ltd.) to obtain a biaxially stretched bottle. The stretching temperature was 100° to 130° C.

The internal volume (excluding the stopper part) of the unstretched preform was 19 $cm^3$, and that (excluding the stopper part) of the resulting stretched bottle was 1469 $cm^3$.

The internal surface area (excluding the internal surface area of the stopper part) of the stretched bottle was 678 $cm^2$.

The stretch index is therefore calculated as follows:

Stretch index=1469/19×1/0.46=168.

The gas barrier properties were evaluated from the permeability coefficients of carbon dioxide gas and oxygen gas. The permeability coefficient of carbon dioxide gas was measured in accordance with Permatran method on a specimen sectioned from the central part of the bottle body having a thickness of 300 to 450 μm, at a temperature of 23° C. and relative humidity of 0% using a carbon dioxide gas permeability testing apparatus (trade name of Permat Rarc-IV type, manufactured by Modern Control, Co., Ltd. (U.S.A.)). The permeability coefficient of oxygen gas was measured in accordance with Oxtran method on a specimen sectioned from the central part of the bottle body having a thickness of 300 to 400 μm, at a temperature of 23° C. and relative humidity of 0% using a permeability testing apparatus (trade name of Oxtran 100 type, manufactured by Modern Control Co., Ltd. (U.S.A.)).

The transparency was measured by a method based on ASTM D 1003 by cutting a body part of the bottle and using a haze meter (trade name of NDH-20D, manufactured by Nippon Denshoku K.K.). The haze value was obtained by measuring the test piece three times, and averaging these three values.

Pressure-resistant strength was measured using a pipe hydraulic destruction testing apparatus, by placing the bottle in a constant temperature water bath held at 30° C., applying a hydraulic pressure at a water flow rate of 500 cm3/min, measuring the hydraulic pressure at which the bottle was broken, and determining the measured value as the strength. The measurement was conducted three times (n=3) on each sample, and the average value was taken as the strength.

The results are shown in Table 1.

EXAMPLE 2

A dicarboxylic acid component composed of 90 mol % of terephthalic acid and 10 mol % of 2,6-naphthalenedicarboxylic acid was esterified with ethylene glycol by the prior art method to obtain a copolyester having an intrinsic viscosity [η] of 0.66 dl/g.

Example 1 was repeated except that the copolyester prepared in Example 2 was used to obtain at first a preform for a biaxially stretch molded article and then a biaxially stretched bottle from the preform.

The transparency and gas barrier properties of the resulting biaxially stretched bottle were evaluated by a procedure similar to that of Example 1.

The results are shown in Table 1.

Comparative Example 1 and 2

The procedure of Example 1 and 2 was repeated except that the stretch index was set at 95 cm and that the total weight of the bottle (preform) was increased by 11% to obtain biaxially stretched bottles. The transparency and gas barrier properties of the bottles were evaluated.

The results are shown in Table 1

EXAMPLE 3

A preform for forming a bottle was obtained by molding the copolyester used in Example 1 using a molding machine (trade name of ASB-50HT, manufactured by Nissei ASB K.K.). The molding temperature was 270° to 290° C.

The thus obtained preform was molded by a molding machine (trade name of LB-01, manufactured by Corpoplast Co., Ltd.) to obtain a biaxially stretched bottle. The stretching temperature was 100° to 130° C.

The internal volume (excluding the stopper part) of the unstretched preform was 4.9 $cm^3$, and that (excluding the stopper part) of the resulting stretched bottle was 519 $cm^3$.

The internal surface area (excluding the stopper part) of the stretched bottle was 345 $cm^2$.

The stretch index is calculated as follows:

Stretch index=519/4.9×1/0.67=158 f=345/519=0.67.

The transparency and gas barrier properties of the resulting biaxially stretched bottle were evaluated by a procedure similar to that in Example 1.

The results are shown in Table 1.

EXAMPLE 4

Example 3 was repeated except that the copolyester employed in Example 2 was used to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 1.

Comparative Example 3

Example 4 was repeated except that the stretch index was set at 92 cm and that the total weight of the bottle (preform) was increased by 11% in Example 3 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 1.

Comparative Example 4

Example 4 was repeated except that the stretch index was set at 92 cm and that the total weight of the bottle (preform) was increased by 11% to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 1.

TABLE 1

| Item | Unit | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Amount of comonomer | mol % | 1 | 10 | 1 | 10 | 1 | 10 | 1 | 10 |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.40 | 0.37 | 0.30 | 0.28 | 0.39 | 0.35 | 0.29 | 0.27 |
| Transparency | | | | | | | | | |
| Total haze | % | 0.5 | 0.3 | 0.3 | 0.2 | 0.8 | 0.6 | 0.5 | 4.4 |
| Internal haze | % | 0.3 | 0.2 | 0.1 | 0.1 | 0.6 | 0.4 | 0.3 | 4.2 |
| $CO_2$ permeability coefficient 23° C., 0% RH (Permatran method) | $\dfrac{cc \cdot mm}{m^2 D \cdot atm}$ | 7.1 | 6.2 | 9.8 | 6.7 | 7.5 | 6.6 | 10.5 | 7.3 |
| $O_2$ permeability coefficient 23° C., 0% RH (Oxtran method) | $\dfrac{cc \cdot mm}{m^2 D \cdot atm}$ | 1.7 | 1.5 | 1.9 | 1.1 | 1.7 | 1.5 | 2.2 | 1 |
| Pressure resistance | $kg/cm^2$ | 17 | 15 | 16 | 14 | 15 | 13 | 14 | 12 |

EXAMPLE 5

A dicarboxylic acid component composed of 99 mol % of terephthalic acid and 1 mol % of isophthalic acid was esterified with ethylene glycol by the prior art method to obtain a copolyester having an intrinsic viscosity [η] of 0.79 dl/g.

The thus obtained copolyester was molded by a procedure similar to that in Example 1 using a molding machine (trade name of M-100A, manufactured by Meiki Seisakusho K.K.) to obtain a preform for molding a bottle. The molding temperature was 250° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 cm$^3$, and that (excluding the stopper part) of the resulting stretched bottle was 1469 cm$^3$.

The internal surface area (excluding the internal surface area of the stopper part) of the stretched bottle was 678 cm$^2$.

The stretch index is therefore calculated as follows:

stretch index=1469/19×1/0.46=168.

The resulting biaxially stretched bottle was evaluated by a procedure similar to that in example 1.

The results are shown in Table 2.

EXAMPLE 6

A dicarboxylic acid component composed of 90 mol % of terephthalic acid and 10 mol % of isophthalic acid was esterified with ethylene glycol by the prior art method to obtain a copolyester having an intrinsic viscosity [η] of 0.80 dl/g.

Example 5 was repeated except that the preform in Example 6 was used to obtain at first a preform for a biaxially stretch molded article was and then a biaxially stretched bottle from the preform.

The transparency and gas barrier properties of the resulting biaxially stretched bottle were evaluated by a procedure similar to that in Example 1.

The results are shown in Table 2.

Comparative Examples 5 and 6

The procedure of Example 5 and 6 was repeated except that the stretch index was set at 95 cm and that the total weight of the bottle (preform) was increased by 11% in Examples 5 and 6 to obtain biaxially stretched bottles. The transparency and gas barrier properties of the bottles were evaluated.

The results are shown in Table 2

EXAMPLE 7

A preform for forming a bottle was prepared by molding the copolyester used in Example 5 using a molding machine (trade name of ASB-50HT, manufactured by Nissei ASB K.K.). The molding temperature was 250° to 270° C.

The thus obtained preform was molded by a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 2.

EXAMPLE 8

Example 7 was repeated except that the copolyester employed in Example 6 was used to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 2.

Comparative Example 7

Example 8 was repeated except that the stretch index was set at 92 cm and that the total weight of the bottle (preform) was increased by 11% in Example 7 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 2.

Comparative Example 8

Example 8 was repeated except that the stretch index was set at 92 cm, and that the total weight of the bottle (preform) was increased by 11% to obtain at first a preform for biaxial stretching and then a biaxially stretched bottle was prepared from the preform.

The transparency and gas barrier properties of the resulting biaxially stretched bottle were evaluated by a procedure similar to that in Example 1.

The results are shown in Table 2.

The internal volume (excluding the stopper part) of the unstretched preform was 19 $cm^3$, and that (excluding the stopper part) of the resulting stretched bottle was 1469 $cm^3$.

The internal surface area (excluding the internal surface area of the stopper part) of the stretched bottle was 678 $cm^2$.

The stretch index is therefore calculated as follows:

stretch index=1469/19×1/0.46=168.

The resulting biaxially stretched bottle was evaluated by a procedure similar to that in example 1.

The results are shown in Table 3.

EXAMPLE 10

A dicarboxylic acid component composed of 90 mol % of terephthalic acid and 10 mol % of adipic acid was esterified with ethylene glycol by the prior art method to obtain a copolyester having an intrinsic viscosity [η] of 0.80 dl/g.

Example 9 was repeated except that the copolyester prepared in Example 10 was used to obtain at first a preform for a biaxially stretch molded article and then a biaxially stretched bottle from the preform.

The transparency and gas barrier properties of the resulting biaxially stretched bottle were evaluated by a procedure similar to that in Example 1.

The results are shown in Table 3.

Comparative Examples 9 and 10

The procedure of Example 9 and 10 was repeated except that the stretch index was set at 95 cm and that the total

TABLE 2

| Item | Unit | Ex. 5 | Ex. 6 | Ex. 7 | Ex. 8 | Comp. Ex. 5 | Comp. Ex. 6 | Comp. Ex. 7 | Comp. Ex. 8 |
|---|---|---|---|---|---|---|---|---|---|
| Amount of comonomer | mol % | 1 | 10 | 1 | 10 | 1 | 10 | 1 | 10 |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.39 | 0.38 | 0.28 | 0.27 | 0.41 | 0.39 | 0.29 | 0.28 |
| Transparency | | | | | | | | | |
| Total haze | % | 0.4 | 0.4 | 0.2 | 0.2 | 0.4 | 0.4 | 0.2 | 0.2 |
| Internal haze | % | 0.2 | 0.2 | 0.1 | 0 | 0.3 | 0.2 | 0.1 | 0.1 |
| $CO_2$ permeability coefficient 23° C., 0% RH (Permatran method) | $\frac{cc \cdot mm}{m^2 D \cdot atm}$ | 7.0 | 7.1 | 10.0 | 7.5 | 7.2 | 7.1 | 11.0 | 7.8 |
| $O_2$ permeability coefficient 23° C., 0% RH (Oxtran method) | $\frac{cc \cdot mm}{m^2 D \cdot atm}$ | 1.6 | 1.6 | 2.2 | 2.1 | 1.7 | 1.7 | 2.3 | 2.3 |
| Pressure resistance | $kg/cm^2$ | 18 | 17 | 21 | 19 | 16 | 15 | 20 | 18 |

EXAMPLE 9

A dicarboxylic acid component composed of 99 mol % of terephthalic acid and 1 mol % of adipic acid was esterified with ethylene glycol by the prior art method to obtain a copolyester having an intrinsic viscosity [η] of 0.80 dl/g.

The thus obtained copolyester was molded by a procedure similar to that in Example 1 using a molding machine (trade name of M-100A, manufactured by Meiki Seisakusho K.K.) to obtain a preform for molding a bottle. The molding temperature was 250° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

weight of the bottle (preform) was increased by 11% to obtain biaxially stretched bottles. The transparency and gas barrier properties of the resulting bottles were evaluated.

The results are shown in Table 3

EXAMPLE 11

A preform for forming a bottle was prepared by molding the copolyester used in Example 9 using a molding machine (trade name of ASB-50HT, manufactured by Nissei ASB K.K.). The molding temperature was 250° to 270° C.

The thus obtained preform was molded by a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm³, and that (excluding the stopper part) of the resulting stretched bottle was 519 cm³.

The internal surface area (excluding the stopper part) of the resulting stretched bottle was 345 cm².

TABLE 3

| Item | Unit | Ex. 9 | Ex. 10 | Ex. 11 | Ex. 12 | Comp. Ex. 9 | Comp. Ex. 10 | Comp. Ex. 11 | Comp. Ex. 12 |
|---|---|---|---|---|---|---|---|---|---|
| Amount of comonomer | mol % | 1 | 10 | 1 | 10 | 1 | 10 | 1 | 10 |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.39 | 0.38 | 0.28 | 0.27 | 0.41 | 0.38 | 0.29 | 0.27 |
| Transparency | | | | | | | | | |
| Total haze | % | 0.4 | 0.3 | 0.2 | 0.2 | 0.5 | 0.4 | 0.2 | 0.2 |
| Internal haze | % | 0.3 | 0.2 | 0 | 0 | 0.3 | 0.2 | 0.1 | 0.1 |
| $CO_2$ permeability coefficient 23° C., 0% RH (Permatran method) | $\dfrac{cc \cdot mm}{day \cdot atm}$ | 7.1 | 7.1 | 10.2 | 7.6 | 7.3 | 7.4 | 12.1 | 8.1 |
| $O_2$ permeability coefficient 23° C., 0% RH (Oxtran method) | $\dfrac{cc \cdot mm}{m^2 D \cdot atm}$ | 1.8 | 1.7 | 2.3 | 2.2 | 1.9 | 1.9 | 2.5 | 2.8 |
| Pressure resistance | kg/cm² | 18 | 18 | 21 | 20 | 17 | 16 | 20 | 19 |

The stretch index is therefore calculated as follows:

stretch index=519/4.9×1/0.67=158 f=345/519=0.67.

The transparency and gas barrier properties of the resulting biaxially stretched bottle was evaluated by a procedure similar to that in Example 1.

The results are shown in Table 3.

EXAMPLE 12

Example 11 was repeated except that the polyester resin composition employed in Example 10 was used to obtain a preform for biaxial stretching and then a biaxially stretched bottle from the preform.

The transparency and gas barrier properties of the resulting biaxially stretched bottle were evaluated by a procedure similar to that in Example 1.

The results are shown in Table 3.

Comparative Example 11

Example 12 was repeated except that the stretch index was set at 92 cm, and that the total weight of the bottle (preform) was increased by 11% in Example 11 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 3.

Comparative Example 12

Example 12 was repeated except that the stretch index was set at 92 cm and that the total weight of the bottle (preform) was increased by 11% to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 3.

EXAMPLE 13

Terephthalic acid was esterified with a dihydroxy compound component composed of 97 mol % of ethylene glycol and 3 mol % of neopentyl alcohol by the prior art method to obtain a copolyester having an intrinsic viscosity [η] of 0.78 dl/g.

The thus obtained copolyester was molded by a procedure similar to that in Example 1 using a molding machine (trade name of M-100A, manufactured by Meiki Seisakusho K.K.) to obtain a preform for forming a bottle. The molding temperature was 240° to 260° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 cm³, and that (excluding the stopper part) of the resulting stretched bottle was 1469 cm³.

The internal surface area (excluding the internal surface area of the stopper part) of the stretched bottle was 678 cm².

The stretch index is therefore calculated as follows:

stretch index=1469/19×1/0.46=168.

The resulting biaxially stretched bottle was evaluated by a procedure similar to that in example 1.

The results are shown in Table 4.

EXAMPLE 14

Terephthalic acid was esterified with a dihydroxy compound component composed of 90 mol % of ethylene glycol and 10 mol % of neopentyl glycol by the prior art method to obtain a copolyester having an intrinsic viscosity [η] of 0.78 dl/g.

Example 13 was repeated except that the copolyester prepared in Example 14 was used to obtain at first a preform for a biaxially stretch molded article and then a biaxially stretched bottle from the preform.

The transparency and gas barrier properties of the resulting biaxially stretched bottle were evaluated by a procedure similar to that in Example 1.

The results are shown in Table 4.

Comparative Examples 13 and 14

The procedure of Examples 13 and 14 was repeated except that the stretch index was set at 95 cm and that the total weight of the bottle (preform) was increased by 11% in Examples 13 and 14 to obtain biaxially stretched bottles. The transparency and gas barrier properties of the bottles were evaluated.

The results are shown in Table 4.

EXAMPLE 15

A preform for forming a bottle was prepared by molding the copolyester used in Example 13 using a molding machine (trade name of ASB-50HT, manufactured by Nissei ASB K.K.). The molding temperature was 240° to 260° C.

The thus obtained preform was molded by a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:

preform for biaxial stretching and then a biaxially stretched bottle from the preform.

The transparency and gas barrier properties of the resulting biaxially stretched bottle were evaluated by a procedure similar to that in Example 1.

The results are shown in Table 4.

Comparative Example 15

Example 15 was repeated except that the stretch index was set at 92 cm and that the total weight of the bottle (preform) was increased by 11% in Example 15 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 4.

Comparative Example 16

Example 16 was repeated except that the stretch index was set at 92 cm and that the total weight of the bottle (preform) was increased by 11% in Example 16 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 4.

TABLE 4

| Item | Unit | Ex. 13 | Ex. 14 | Ex. 15 | Ex. 16 | Comp. Ex. 13 | Comp. Ex. 14 | Comp. Ex. 15 | Comp. Ex. 16 |
|---|---|---|---|---|---|---|---|---|---|
| Amount of comonomer | mol % | 3 | 10 | 3 | 10 | 3 | 10 | 3 | 10 |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.40 | 0.38 | 0.28 | 0.27 | 0.41 | 0.39 | 0.29 | 0.28 |
| Transparency | | | | | | | | | |
| Total haze | % | 0.5 | 0.5 | 0.4 | 0.3 | 0.5 | 0.5 | 0.4 | 0.4 |
| Internal haze | % | 0.3 | 0.3 | 0.2 | 0.2 | 0.3 | 0.4 | 0.2 | 0.3 |
| $CO_2$ permeability coefficient 23° C., 0% RH (Permatran method) | $\frac{cc \cdot mm}{m^2 D \cdot atm}$ | 7.0 | 7.1 | 10.8 | 7.6 | 7.3 | 7.2 | 11.4 | 8.2 |
| $O_2$ permeability coefficient 23° C., 0% RH (Oxtran method) | $\frac{cc \cdot mm}{m^2 D \cdot atm}$ | 1.6 | 1.7 | 2.2 | 2.1 | 1.7 | 1.8 | 2.4 | 2.4 |
| Pressure resistance | kg/cm$^2$ | 18 | 18 | 21 | 19 | 17 | 16 | 19 | 18 | stretch index=519/4.9×1/0.67=158
f=345/519=0.67.

The transparency and gas barrier properties of the resulting biaxially stretched bottle were evaluated by a procedure similar to that in Example 1.

The results are shown in Table 4.

EXAMPLE 16

Example 15 was repeated except that the copolyester employed in Example 14 was used to obtain at first a

EXAMPLE 17

Terephthalic acid was esterified with a dihydroxy compound component composed of 97 mol % of ethylene glycol and 3 mol % of cyclohexanedimethanol by the prior art method to obtain a copolyester having an intrinsic viscosity [η] of 0.80 dl/g.

The thus obtained copolyester was molded by a procedure similar to that in Example 1 using a molding machine (trade name of M-100A, manufactured by Meiki Seisakusho K.K.)

to obtain a preform for forming a bottle. The molding temperature was 250° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 cm$^3$, and that (excluding the stopper part) of the resulting stretched bottle was 1469 cm$^3$.

The internal surface area (excluding the internal surface area of the stopper part) of the stretched bottle was 678 cm$^2$.

The stretch index is therefore calculated as follows:

stretch index=1469/19×1/0.46=168.

The resulting biaxially stretched bottle was evaluated by a procedure similar to that in example 1.

The results are shown in Table 5

EXAMPLE 18

Terephthalic acid was esterified with a dihydroxy compound component composed of 90 mol % of ethylene glycol and 10 mol % of cyclohexanedimethanol by the prior art method to obtain a copolyester having an intrinsic viscosity [η] of 0.81 dl/g.

Example 17 was repeated except that the copolyester prepared in Example 18 was used to obtain at first a preform for a biaxially stretch molded article and then a biaxially stretched bottle from the preform.

The transparency and gas barrier properties of the resulting biaxially stretched bottle were evaluated by a procedure similar to that in Example 1.

The results are shown in Table 5.

Comparative Examples 17 and 18

The procedure of Examples 17 and 18 was repeated except that the stretch index was set at 95 cm and that the total weight of the bottle (preform) was increased by 11% in Examples 17 and 18 to obtain biaxially stretched bottles. The transparency and gas barrier properties of the resulting bottles were evaluated.

The results are shown in Table 5.

EXAMPLE 19

A preform for forming a bottle was prepared by molding the copolyester employed in Example 17 using a molding machine (trade name of ASB-50HT, manufactured by Nissei ASB K.K.). The molding temperature was 250° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 5.

EXAMPLE 20

Example 19 was repeated except that the copolyester employed in Example 18 was used to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 5.

Comparative Example 19

Example 19 was repeated except that the stretch index was set at 92 cm and that the total weight of the bottle (preform) was increased by 11% in Example 19 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 5.

Comparative Example 20

Example 20 was repeated except that the stretch index was set at 92 cm and that the total weight of the bottle (preform) was increased by 11% in Example 20 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 5.

TABLE 5

| Item | Unit | Ex. 17 | Ex. 18 | Ex. 19 | Ex. 20 | Comp. Ex. 17 | Comp. Ex. 18 | Comp. Ex. 19 | Comp. Ex. 20 |
| --- | --- | --- | --- | --- | --- | --- | --- | --- | --- |
| Amount of comonomer | mol % | 3 | 10 | 3 | 10 | 3 | 10 | 3 | 10 |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.39 | 0.38 | 0.28 | 0.27 | 0.40 | 0.39 | 0.29 | 0.28 |
| Transparency | | | | | | | | | |
| Total haze | % | 0.3 | 0.3 | 0.2 | 0.1 | 0.3 | 0.3 | 0.2 | 0.2 |
| Internal haze | % | 0.1 | 0.1 | 0.1 | 0 | 0.2 | 0.1 | 0.1 | 0.1 |

TABLE 5-continued

| Item | Unit | Ex. 17 | Ex. 18 | Ex. 19 | Ex. 20 | Comp. Ex. 17 | Comp. Ex. 18 | Comp. Ex. 19 | Comp. Ex. 20 |
|---|---|---|---|---|---|---|---|---|---|
| $CO_2$ permeability coefficient 23° C., 0% RH (Permatran method) | $\dfrac{cc \cdot mm}{m^2 D \cdot atm}$ | 7.1 | 7.1 | 10.5 | 8.1 | 7.3 | 7.2 | 11.2 | 8.5 |
| $O_2$ permeability coefficient 23° C., 0% RH (Oxtran method) | $\dfrac{cc \cdot mm}{m^2 D \cdot atm}$ | 1.6 | 1.7 | 2.2 | 2.1 | 1.7 | 1.8 | 2.4 | 2.3 |
| Pressure resistance | kg/cm² | 18 | 17 | 19 | 18 | 17 | 17 | 18 | 17 |

EXAMPLE 21

Terephthalic acid was esterified with a dihydroxy compound component composed of 97 mol % of ethylene glycol and 3 mol % of diethylene glycol by the prior art method to obtain a copolyester having an intrinsic viscosity [η] of 0.78 dl/g.

The thus obtained copolyester was molded by a procedure similar to that in Example 1 using a molding machine (trade name of M-100A, manufactured by Meiki Seisakusho K.K.) to obtain a preform for forming a bottle. The molding temperature was 270° to 290° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 cm³, and that (excluding the stopper part) of the resulting stretched bottle was 1469 cm³.

The internal surface area (excluding the internal surface area of the stopper part) of the stretched bottle was 678 cm².

The stretch index is therefore calculated as follows:

stretch index=1469/19×1/0.46=168.

The resulting biaxially stretched bottle was evaluated by a procedure similar to that in example 1.

The results are shown in Table 6

EXAMPLE 22

Terephthalic acid was esterified with a dihydroxy compound component composed of 95 mol % of ethylene glycol and 5 mol % of diethylene glycol by the prior art method to obtain a copolyester having an intrinsic viscosity [η] of 0.76 dl/g.

The procedure of Example 21 was repeated except that the copolyester prepared in Example 22 was used to obtain at first a preform for a biaxially stretch molded article and then a biaxially stretched bottle from the preform.

The transparency and gas barrier properties of the biaxially stretched bottle were evaluated by a procedure similar to that in Example 1.

The results are shown in Table 6.

Comparative Examples 21 and 22

The procedure of Examples 21 and 22 was repeated except that the stretch index was set at 95 cm and that the total weight of the bottle (preform) was increased by 11% in Examples 21 and 22 to obtain biaxially stretched bottles.

The transparency and gas barrier properties of the bottles were evaluated.

The results are shown in Table 6.

EXAMPLE 23

A preform for forming a bottle was prepared by molding the copolyester employed in Example 21 using a molding machine (trade name of ASB-50HT, manufactured by Nissei ASB K.K.). The molding temperature was 260° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm³, and that (excluding the stopper part) of the resulting stretched bottle was 519 cm³.

The internal surface area (excluding the stopper part) of the stretched bottle was 345 cm².

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 6.

EXAMPLE 24

Example 23 was repeated except that a polyester resin composition employed in Example 22 was used to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 6.

Comparative Example 23

Example 24 was repeated except that the stretch index was set at 92 cm and that the total weight of the bottle (preform) was increased by 11% in Example 23 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 6.

Comparative Example 24

Example 24 was repeated except that the stretch index was set at 92 cm and that the total weight of the bottle (preform) was increased by 11% to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 6.

The internal surface area (excluding the internal surface area of the stopper part) of the stretched bottle was 678 cm$^2$.

The stretch index is calculated as follows:

stretch index=1469/19×1/0.46=168

The resulting biaxially stretched bottle was evaluated by a procedure similar to that in Example 1.

The results are shown in Table 7.

EXAMPLE 26

Example 25 was repeated except that a copolyester resin described below was used and that a resin composition

TABLE 6

| Item | Unit | Ex. 21 | Ex. 22 | Ex. 23 | Ex. 24 | Comp. Ex. 21 | Comp. Ex. 22 | Comp. Ex. 23 | Comp. Ex. 24 |
|---|---|---|---|---|---|---|---|---|---|
| Amount of comonomer | mol % | 3 | 5 | 3 | 5 | 3 | 5 | 3 | 5 |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.39 | 0.36 | 0.28 | 0.27 | 0.40 | 0.37 | 0.29 | 0.28 |
| Transparency | | | | | | | | | |
| Total haze | % | 0.4 | 0.3 | 0.2 | 0.1 | 0.4 | 0.3 | 0.2 | 0.2 |
| Internal haze | % | 0.2 | 0.2 | 0 | 0 | 0.2 | 0.2 | 0.1 | 0.1 |
| $CO_2$ permeability coefficient 23° C., 0% RH (Permatran method) | $\frac{cc \cdot mm}{m^2 D \cdot atm}$ | 7.1 | 7.0 | 11.8 | 13.6 | 7.4 | 7.3 | 12.3 | 13.9 |
| $O_2$ permeability coefficient 23° C., 0% RH (Oxtran method) | $\frac{cc \cdot mm}{m^2 D \cdot atm}$ | 1.6 | 1.6 | 2.2 | 2.1 | 1.8 | 1.8 | 2.4 | 2.3 |
| Pressure resistance | kg/cm$^2$ | 19 | 17 | 20 | 19 | 17 | 16 | 18 | 17 |

EXAMPLE 25

The resins described below were used for preparing a polyester resin composition for high stretch molding.

Polyethylene terephthalate: a resin (trade name of J 135, manufactured by Mitsui PET Resin K.K.) having a relative viscosity (IV) of 0.85 dl/g measured in o-chlorophenol at 25° C.;

Copolyester: the dicarboxylic acid component thereof being composed of 90 mol % of isophthalic acid constituent units and 10 mol % of terephthalic acid constituent units, the dihydroxy compound component thereof being composed of 15 mol % of 1,3-bis(2-hydroxyethoxy)benzene constituent units and 85 mol % of ethylene glycol constituent units, the copolyester comprising 0.3 part by mol of trimethylolpropane constituent units based on 100 parts by mol of dicarboxylic acid constituent units and having a relative viscosity (IV) of 0.85 dl/g measured in o-chlorophenol at 25° C.

After mixing 1% by weight of the copolyester and 99% by weight of the polyethylene terephthalate mentioned above, the resulting polyester resin composition (I) was molded by a molding machine (trade name of M-100A, manufactured by Meiki Seisakusho K.K.) to obtain a preform for forming a bottle. The molding temperature was 270° to 290° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 cm$^3$, and that (excluding the stopper part) of the resulting stretched bottle was 1469 cm$^3$.

composed of 4% by weight of the copolyester and 96% by weight of polyethylene terephthalate was employed to obtain at first a preform for biaxially stretch molded article and then a biaxially stretched bottle from the preform.

Copolyester: the dicarboxylic acid component thereof being composed of 90 mol % of isophthalic acid constituent units and 10 mol % of terephthalic acid constituent units, the dihydroxy compound component thereof being composed of 7.5 mol % of 1,3-bis(2-hydroxyethoxy)benzene constituent units and 92.5 mol % of ethylene glycol constituent units, the copolyester comprising 0.3 part by mol of trimethylolpropane constituent units based on 100 parts by mol of the dicarboxylic acid constituent units, and having a relative viscosity (IV) of 0.85 dl/g measured in o-chlorophenol at 25° C.

The transparency and gas barrier properties of the resulting biaxially stretched bottle was evaluated by a procedure similar to that in Example 1.

The results are shown in Table 7.

Comparative Examples 25 and 26

The procedure of Examples 25 and 26 was repeated except that the stretching index was set at 95 cm and that the total weight of the bottle (preform) was increased by 11% in Examples 25 and 26 to obtain a biaxially stretched bottle. The transparency and gas barrier properties of the bottle were evaluated.

The results are shown in Table 7.

Comparative Example 27

Comparative Example 25 was repeated except that only the polyethylene terephthalate was used without using the copolyester in Comparative Example 25 to obtain biaxially stretched bottles. The transparency and gas barrier properties of the bottles were evaluated.

The results are shown in Table 7.

Comparative Example 28

Example 25 was repeated except that only the polyethylene terephthalate was used without using the copolyester in Example 25 to obtain a biaxially stretched bottle. The transparency and gas barrier properties of the resulting bottle were evaluated.

The results are shown in Table 7.

was used to obtain at first a preform for biaxial stretching and then a biaxially stretched bottle from the preform.

The transparency and gas barrier properties of the bottle were evaluated by a procedure similar to that in Example 1.

The results are shown in Table 8.

Comparative Example 29

Example 28 was repeated except that the stretch index was set at 92 cm and that the total weight of the preform was increased by 11% in Example 27 to obtain at first a preform and then a biaxially stretched bottle from the preform.

The transparency and gas barrier properties of the resulting bottle were evaluated.

TABLE 7

| Item | Unit | Example 25 | Example 26 | Comp. Ex. 25 | Comp. Ex. 26 | Comp. Ex. 27 | Comp. Ex. 28 |
| --- | --- | --- | --- | --- | --- | --- | --- |
| PET/copolyester (wt. ratio) | mol % | 99/1 | 96/4 | 99/1 | 96/4 | 100/0 | 100/0 |
| Stretch index | cm | 168 | 168 | 95 | 95 | 95 | 168 |
| Total wt. of bottle | g | 54 | 54 | 60 | 60 | 60 | 60 |
| Thickness of bottle body (part at haze measurement) | mm | 0.39 | 0.38 | 0.40 | 0.40 | 0.40 | 0.40 |
| Transparency | | | | | | | |
| Total haze | % | 0.1 | 0.1 | 0.1 | 0.1 | 0.1 | 4.2 |
| Internal haze | % | 0.1 | 0.1 | 0.1 | 0.1 | 0.1 | 4.0 |
| $CO_2$ permeability coefficient 23° C., 0% RH (Permatran method) | $\frac{cc \cdot mm}{m^2 D \cdot atm}$ | 7.5 | 5.2 | 8.3 | 6.8 | 8.5 | 7.6 |
| $O_2$ permeability coefficient 23° C., 0% RH (Oxtran method) | $\frac{cc \cdot mm}{m^2 D \cdot atm}$ | 1.7 | 1.6 | 1.9 | 1.8 | 2.0 | 1.8 |
| Pressure resistance | $kg/cm^2$ | 20 | 18 | 16 | 16 | 16 | 12 |

EXAMPLE 27

A preform for forming a bottle was obtained by molding polyester resin composition [I]employed in Example 25 using a molding machine (trade name of ASB-50HT, manufactured by Nissei ASB K.K.). The molding temperature was 260° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 $cm^3$, and that (excluding the stopper part) of the resulting stretched bottle was 519 $cm^3$.

The internal surface area (excluding the stopper part) of the stretched bottle was 345 $cm^2$.

The stretch index is therefore calculated as follows:

stretch index=519/4.9×1/0.67=158 f=345/519=0.67.

The transparency and gas barrier properties of the resulting biaxially stretched bottle were evaluated.

The results are shown in Table 8.

EXAMPLE 28

The procedure of Example 27 was repeated except that the polyester resin composition employed in Example 26

The results are shown in Table 8.

Comparative Example 30

Example 27 was repeated except that the stretch index was set at 92 cm and that the total weight of the preform was increased by 11% in Example 28 to obtain at first a preform and then a biaxially stretched bottle from the preform.

The transparency and gas barrier properties of the bottle were evaluated by a procedure similar to that in Example 1.

The results are shown in Table 8.

Comparative Example 31

Comparative Example 29 was repeated except that only the polyethylene terephthalate was used, that a stretch index was set at 92 cm and that the total weight of the preform was increased by 11% to obtain a biaxially stretched bottle.

The transparency and gas barrier properties of the bottle were evaluated by a procedure similar to that in Example 1.

The results are shown in Table 8.

TABLE 8

| Item | Unit | Example 27 | Example 28 | Comp. Ex. 29 | Comp. Ex. 30 | Comp. Ex. 31 | Comp. Ex. 32 |
|---|---|---|---|---|---|---|---|
| PET/copolyester (wt. ratio) | | 99/1 | 96/4 | 99/1 | 96/4 | 100/0 | 100/0 |
| Stretch index | cm | 158 | 158 | 92 | 92 | 92 | 158 |
| Total wt. of bottle | g | 21 | 21 | 23 | 23 | 23 | 23 |
| Thickness of bottle body (part at haze measurement) | mm | 0.28 | 0.27 | 0.29 | 0.28 | 0.29 | 0.31 |
| Transparency | | | | | | | |
| Total haze | % | 0.1 | 0.1 | 0.1 | 0.1 | 0.1 | 2.2 |
| Internal haze | % | 0 | 0 | 0 | 0 | 0 | 1.7 |
| $CO_2$ permeability coefficient 23° C., 0% RH (Permatran method) | $\frac{cc \cdot mm}{m^2 D \cdot atm}$ | 9.5 | 6.8 | 11.2 | 7.3 | 11.3 | 10.1 |
| $O_2$ permeability coefficient 23° C., 0% RH (Oxtran method) | $\frac{cc \cdot mm}{m^2 D \cdot atm}$ | 2.0 | 1.9 | 2.2 | 2.0 | 2.3 | 2.1 |
| Pressure resistance | kg/cm² | 20 | 18 | 18 | 17 | 18 | 20 |

EXAMPLE 29

The resins described below were used for preparing a polyester resin composition for high stretch molding.

Polyethylene terephthalate: a resin (trade name of J 125, manufactured by Mitsui PET Resin K.K.) having a relative viscosity (IV) of 0.79 dl/g measured in o-chlorophenol at 25° C.;

Copolyester: a resin prepared by esterifying a dicarboxylic acid component composed of 50 mol % of terephthalic acid and 50 mol % of isophthalic acid with ethylene glycol by the prior art method, and having a relative viscosity (IV) of 0.85 dl/g.

After mixing 5% by weight of the copolyester and 95% by weight of the polyethylene terephthalate mentioned above, the resulting polyester resin composition (II) was molded by a molding machine (trade name of M-100A, manufactured by Meiki Seisakusho K.K.) to obtain a preform for forming a bottle. The molding temperature was 270° to 290° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 cm³, and that (excluding the stopper part) of the resulting stretched bottle was 1469 cm³.

The internal surface area (excluding the internal surface area of the stopper part) of the stretched bottle was 678 cm².

The stretch index is therefore calculated as follows:

stretch index=1469/19×1/0.46=168

The resulting biaxially stretched bottle was evaluated by a procedure similar to that in Example 1.

The results are shown in Table 9.

EXAMPLE 30

Example 29 was repeated except that a resin composition composed of 10% by weight of the copolyester and 90% by weight of the polyethylene terephthalate was used in Example 29 to obtain at first a preform for a biaxially stretch molded article and then a biaxially stretched bottle from the preform.

The transparency and gas barrier properties of the resulting biaxially stretched bottle were evaluated by a procedure similar to that in Example 1.

The results are shown in Table 9.

Comparative Examples 33 and 34

The procedure of Examples 29 and 30 was repeated except that the stretching index was set at 95 cm and that the total weight of the bottle (preform) was increased by 11% in Examples 29 and 30 to obtain a biaxially stretched bottle.

The transparency and gas barrier properties of the resulting biaxially stretched bottle were evaluated.

The results are shown in Table 9.

Comparative Examples 35

Comparative Example 33 was repeated except that only the polyethylene terephthalate was used without using the copolyester and that the total weight of the preform was increased by 11% in Comparative Example 33 to obtain a biaxially stretched bottle.

The transparency and gas barrier properties of the resulting biaxially stretched bottle were evaluated.

The results are shown in Table 9.

Comparative Examples 36

Example 29 was repeated except that only the polyethylene terephthalate was used without using the copolyester and that the total weight of the preform was increased by 11% in Example 29 to obtain a biaxially stretched bottle.

The transparency and gas barrier properties of the resulting biaxially stretched bottle were evaluated.

The results are shown in Table 9.

TABLE 9

| Item | Unit | Example 29 | Example 30 | Comp. Ex. 33 | Comp. Ex. 34 | Comp. Ex. 35 | Comp. Ex. 36 |
| --- | --- | --- | --- | --- | --- | --- | --- |
| PET/copolyester (wt. ratio) | | 95/5 | 90/10 | 95/5 | 90/10 | 100/0 | 100/0 |
| Stretch index | cm | 168 | 168 | 95 | 95 | 95 | 168 |
| Total wt. of bottle | g | 54 | 54 | 60 | 60 | 60 | 60 |
| Thickness of bottle body (part at haze measurement) | mm | 0.38 | 0.37 | 0.39 | 0.38 | 0.39 | 0.40 |
| Transparency | | | | | | | |
| Total haze | % | 0.2 | 0.2 | 0.4 | 0.3 | 0.3 | 5.6 |
| Internal haze | % | 0.1 | 0 | 0.2 | 0.2 | 0.2 | 4.8 |
| $CO_2$ permeability coefficient 23° C., 0% RH (Permatran method) | $\frac{cc \cdot mm}{m^2 D \cdot atm}$ | 7.2 | 7.1 | 7.1 | 7.2 | 8.6 | 7.5 |
| $O_2$ permeability coefficient 23° C., 0% RH (Oxtran method) | $\frac{cc \cdot mm}{m^2 D \cdot atm}$ | 1.6 | 1.6 | 1.7 | 1.8 | 2.1 | 1.9 |
| Pressure resistance | kg/cm² | 17 | 16 | 15 | 14 | 15 | 11 |

EXAMPLE 31

A preform for forming a bottle was obtained by molding the polyester resin composition employed in Example 29 using a molding machine (trade name of ASB-50HT, manufactured by Nissei ASB K.K.). The molding temperature was 260° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm³, and that (excluding the stopper part) of the resulting stretched bottle was 519 cm³.

The internal surface area (excluding the stopper part) of the stretched bottle was 345 cm².

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 10.

EXAMPLE 32

Example 31 was repeated except that the polyester resin composition employed in Example 30 was used to obtain at first a preform for biaxial stretching and then a biaxially stretched bottle from the preform.

The transparency and gas barrier properties of the resulting biaxially stretched bottle were evaluated.

The results are shown in Table 10.

Comparative Example 37

Example 31 was repeated except that the stretching index was set at 92 cm and that the total weight of the preform was increased by 10% in Example 31 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 10.

Comparative Example 38

Example 32 was repeated except that the stretch index was set at 92 cm and that the total weight of the preform was increased by 10% in Example 32 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 10.

Comparative Example 39

Example 32 was repeated except that only the polyethylene terephthalate was used, that the stretch index was set at 92 cm and that the total weight of the preform was increased by 10% to obtain a biaxially stretched bottle.

The transparency and gas barrier properties of the resulting bottle were evaluated by a procedure similar to that in Example 1.

The results are shown in Table 10.

Comparative Example 40

Example 32 was repeated except that only the polyethylene terephthalate was used and that the weight of the bottle (preform) was increased by 10% to obtain at first a preform and then a biaxially stretched bottle from the preform.

The transparency and gas barrier properties of the resulting biaxially stretched bottle were evaluated by a procedure similar to that in Example 1.

The results are shown in Table 10.

TABLE 10

| Item | Unit | Example 31 | Example 32 | Comp. Ex. 37 | Comp. Ex. 38 | Comp. Ex. 39 | Comp. Ex. 40 |
|---|---|---|---|---|---|---|---|
| PET/copolyester (wt. ratio) | | 95/5 | 90/10 | 95/5 | 90/10 | 100/0 | 100/0 |
| Stretch index | cm | 158 | 158 | 92 | 92 | 92 | 158 |
| Total wt. of bottle | g | 21 | 21 | 23 | 23 | 23 | 23 |
| Thickness of bottle body (part at haze measurement) | mm | 0.27 | 0.26 | 0.28 | 0.27 | 0.28 | 0.30 |
| Transparency | | | | | | | |
| Total haze | % | 0.2 | 0.1 | 0.3 | 0.3 | 0.2 | 2.5 |
| Internal haze | % | 0 | 0 | 0.2 | 0.1 | 0.1 | 1.8 |
| $CO_2$ permeability coefficient 23° C., 0% RH (Permatran method) | $\frac{cc \cdot mm}{m^2 D \cdot atm}$ | 7.5 | 7.6 | 7.7 | 7.8 | 12.0 | 11.6 |
| $O_2$ permeability coefficient 23° C., 0% RH (Oxtran method) | $\frac{cc \cdot mm}{m^2 D \cdot atm}$ | 2.2 | 2.3 | 2.4 | 2.3 | 2.5 | 2.2 |
| Pressure resistance | kg/cm² | 19 | 18 | 17 | 16 | 18 | 20 |

EXAMPLE 33

The resins described below were used for preparing a polyester resin composition for high stretch molding.

Polyethylene terephthalate: a resin (trade name of J 125, manufactured by Mitsui PET Resin K.K.) having a relative viscosity (IV) of 0.79 dl/g measured in o-chlorophenol at 25° C.;

Copolyester: a resin prepared by esterifying a dicarboxylic acid component composed of 90 mol % of terephthalic acid and 10 mol % of isophthalic acid with ethylene glycol by the prior art method, and having an intrinsic viscosity (η) of 0.80 dl/g.

A polyester resin composition was obtained by mixing 20% by weight of the copolyester and 80% by weight of the polyethylene terephthalate mentioned above. Example 29 was repeated except that the above-prepared polyester resin composition was used to obtain at first a preform for a biaxially stretch molded article and then a biaxially stretched bottle from the preform.

The transparency and gas barrier properties of the resulting biaxially stretched bottle was evaluated by a procedure similar to that in Example 1.

The results are shown in Table 11.

EXAMPLE 34

Example 33 was repeated except that a resin composition composed of 50% by weight of the copolyester and 50% by weight of the polyethylene terephthalate was used in Example 33 to obtain at first a preform for a biaxially stretch molded article article and then a biaxially stretched bottle from the preform.

The transparency and gas barrier properties of the resulting biaxially stretched bottle were evaluated by a procedure similar to that in Example 1.

The results are shown in Table 11.

Comparative Examples 41 and 42

The procedure of Examples 33 and 34 was repeated except that the stretch index was set at 95 cm and that the total weight of the bottle (preform) was increased by 11% to obtain biaxially stretched bottles.

The transparency and gas barrier properties of the resulting biaxially stretched bottles were evaluated.

The results are shown in Table 11.

Comparative Examples 43

The procedure of Comparative Example 9 was repeated except that only the polyethylene terephthalate was used without using the copolyester in Comparative Example 41 and that the total weight of the preform was increased by 11% to obtain a biaxially stretched bottle. The transparency and gas barrier properties of the resulting biaxially stretched bottle were evaluated.

The results are shown in Table 11.

Comparative Examples 44

The procedure of Example 5 was repeated except that only the polyethylene terephthalate was employed without using the copolyester in Example 33 and that the total weight of the preform was increased by 11% to obtain a biaxially stretched bottle. The transparency and gas barrier properties of the resulting biaxially stretched bottle were evaluated.

The results are shown in Table 11.

TABLE 11

| Item | Unit | Example 33 | Example 34 | Comp. Ex. 41 | Comp. Ex. 42 | Comp. Ex. 43 | Comp. Ex. 44 |
|---|---|---|---|---|---|---|---|
| PET/copolyester (wt. ratio) | | 80/20 | 50/50 | 80/20 | 50/50 | 100/0 | 100/0 |
| Stretch index | cm | 168 | 168 | 95 | 95 | 95 | 168 |
| Total wt. of bottle | g | 54 | 54 | 60 | 60 | 60 | 60 |
| Thickness of bottle body (part at haze measurement) | mm | 0.39 | 0.38 | 0.39 | 0.38 | 0.39 | 0.40 |

TABLE 11-continued

| Item | Unit | Example 33 | Example 34 | Comp. Ex. 41 | Comp. Ex. 42 | Comp. Ex. 43 | Comp. Ex. 44 |
|---|---|---|---|---|---|---|---|
| Transparency | | | | | | | |
| Total haze | % | 0.1 | 0.1 | 0.4 | 0.3 | 0.3 | 5.6 |
| Internal haze | % | 0 | 0 | 0.1 | 0.2 | 0.2 | 4.8 |
| $CO_2$ permeability coefficient 23° C., 0% RH (Permatran method) | $\frac{cc \cdot mm}{m^2 D \cdot atm}$ | 7.3 | 7.1 | 7.2 | 7.2 | 8.6 | 7.5 |
| $O_2$ permeability coefficient 23° C., 0% RH (Oxtran method) | $\frac{cc \cdot mm}{m^2 D \cdot atm}$ | 1.7 | 1.6 | 1.7 | 1.8 | 2.1 | 1.9 |
| Pressure resistance | kg/cm$^2$ | 17 | 16 | 15 | 14 | 15 | 11 |

EXAMPLE 35

A preform for forming a bottle was obtained by molding the polyester resin composition employed in Example 33 using a molding machine (trade name of ASB-50HT, manufactured by Nissei ASB K.K.). The molding temperature was 260° to 270° C.

The thus obtained preform was molded by a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 12.

EXAMPLE 36

Example 35 was repeated by using the polyester resin composition employed in Example 35 to obtain at first a preform for biaxial stretching and then a biaxially stretched bottle from the preform.

The transparency and gas barrier properties of the resulting biaxially stretched bottle were evaluated.

The results are shown in Table 12.

Comparative Example 45

Example 35 was repeated except that the stretch index was set at 92 cm and that the total weight of the preform was increased by 10% to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 12.

Comparative Example 46

Example 36 was repeated except that the stretch index was set at 92 cm and that the total weight of the preform was increased by 10% in Example 36 to obtain a biaxially stretched bottle.

The transparency and gas barrier properties of the biaxially stretched bottle were evaluated by a procedure similar to that in Example 1.

The results are shown in Table 12.

Comparative Example 47

Example 36 was repeated except that only the polyethylene terephthalate was used, that the stretch index was set at 92 cm and that the total weight of the preform was increased by 10% to obtain a biaxially stretched bottle.

The transparency and gas barrier properties of the resulting biaxially stretched bottle were evaluated by a procedure similar to that in Example 1.

The results are shown in Table 12.

Comparative Example 48

Example 36 was repeated except that only the polyethylene terephthalate was used and that the weight of the bottle (preform) was increased by 10% to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 12.

TABLE 12

| Item | Unit | Example 35 | Example 36 | Comp. Ex. 45 | Comp. Ex. 46 | Comp. Ex. 47 | Comp. Ex. 48 |
|---|---|---|---|---|---|---|---|
| PET/copolyester (wt. ratio) | | 80/20 | 50/50 | 80/20 | 50/50 | 100/0 | 100/0 |
| Stretch index | cm | 158 | 158 | 92 | 92 | 92 | 158 |
| Total wt. of bottle | g | 21 | 21 | 23 | 23 | 23 | 23 |

TABLE 12-continued

| Item | Unit | Example 35 | Example 36 | Comp. Ex. 45 | Comp. Ex. 46 | Comp. Ex. 47 | Comp. Ex. 48 |
|---|---|---|---|---|---|---|---|
| Thickness of bottle body (part at haze measurement) | mm | 0.28 | 0.27 | 0.28 | 0.27 | 0.28 | 0.30 |
| Transparency | | | | | | | |
| Total haze | % | 0.1 | 0.1 | 0.3 | 0.3 | 0.2 | 2.5 |
| Internal haze | % | 0 | 0 | 0.2 | 0.1 | 0.1 | 1.8 |
| $CO_2$ permeability coefficient 23° C., 0% RH (Permatran method) | $\frac{cc \cdot mm}{m^2 D \cdot atm}$ | 7.6 | 7.6 | 7.7 | 7.8 | 12.0 | 11.6 |
| $O_2$ permeability coefficient 23° C., 0% RH (Oxtran method) | $\frac{cc \cdot mm}{m^2 D \cdot atm}$ | 2.3 | 2.3 | 2.4 | 2.3 | 2.5 | 2.2 |
| Pressure resistance | kg/cm$^2$ | 19 | 18 | 17 | 16 | 18 | 20 |

EXAMPLE 37

The resins described below were used for preparing a polyester resin composition for high stretch molding.

Polyethylene terephthalate: a resin (trade name of J 125, manufactured by Mitsui PET Resin K.K.) having a relative viscosity (IV) of 0.79 dl/g measured in o-chlorophenol at 25° C.;

Copolyester: a resin prepared by esterifying a dicarboxylic acid component composed of 90 mol % of terephthalic acid and 10 mol % of isophthalic acid with ethylene glycol by the prior art method, and having a relative viscosity (IV) of 0.80 dl/g.

A polyester resin composition was prepared by mixing 30% by weight of the copolyester and 70% by weight of the polyethylene terephthalate mentioned above. Example 29 was repeated except that the above-prepared polyester resin composition was used to obtain at first a preform for biaxially stretch molded article and then a biaxially stretched bottle from the preform.

The transparency and gas barrier properties of the resulting biaxially stretched bottle were evaluated by a procedure similar to that in Example 1.

The results are shown in Table 13.

EXAMPLE 38

A preform for forming a bottle was prepared by molding the polyester resin composition employed in Example 37 using a molding machine (trade name of ASB-50HT, manufactured by Nissei ASB K.K.). The molding temperature was 260° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 13.

TABLE 13

| Item | Unit | Example 37 | Example 38 | Comp. Ex. 49 | Comp. Ex. 50 |
|---|---|---|---|---|---|
| PET/copolyester (wt. ratio) | | 70/30 | 70/30 | 70/30 | 70/30 |
| Stretch index | cm | 168 | 158 | 95 | 92 |
| Total wt. of bottle | g | 54 | 21 | 60 | 23 |
| Thickness of bottle body (part at haze measurement) | mm | 0.37 | 0.27 | 0.38 | 0.28 |
| Transparency | | | | | |
| Total haze | % | 0.1 | 0.1 | 0.3 | 0.3 |
| Internal haze | % | 0 | 0 | 0.2 | 0.1 |
| $CO_2$ permeability coefficient 23° C., 0% RH (Permatran method) | $\frac{cc \cdot mm}{m^2 D \cdot atm}$ | 6.8 | 7.4 | 7.1 | 7.6 |

TABLE 13-continued

| Item | Unit | Example 37 | Example 38 | Comp. Ex. 49 | Comp. Ex. 50 |
|---|---|---|---|---|---|
| $O_2$ permeability coefficient 23° C., 0% RH (Oxtran method) | $\frac{cc \cdot mm}{m^2D \cdot atm}$ | 1.4 | 1.7 | 1.6 | 1.8 |
| Pressure resistance | kg/cm$^2$ | 18 | 20 | 15 | 18 |

EXAMPLE 39

The resins described below were used for preparing a polyester resin composition for high stretch molding.

Polyethylene terephthalate: a resin (trade name of J 125, manufactured by Mitsui PET Resin K.K.) having a relative viscosity (IV) of 0.79 dl/g measured in o-chlorophenol at 25° C.;

Copolyester: a resin prepared by esterifying a dicarboxylic acid component composed of 93 mol % of terephthalic acid and 7 mol % of isophthalic acid with ethylene glycol by the prior art method, and having a relative viscosity (IV) of 0.80 dl/g.

A polyester resin composition was prepared by mixing 70% by weight of the copolyester and 30% by weight of the polyethylene terephthalate mentioned above. Example 29 was repeated except that the above-prepared polyester resin composition was used to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 14.

EXAMPLE 40

A preform for forming a bottle was prepared by molding the polyester resin composition employed in Example 39 using a molding machine (trade name of ASB-50HT, manufactured by Nissei ASB K.K.). The molding temperature was 260° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 14.

Comparative Example 49

Example 37 was repeated except that the stretching index was set at 95 cm and that the total weight of the preform was increased by 10% in Example 37 to obtain at first a preform for biaxial stretching and then a biaxially stretched bottle from the preform.

The transparency and gas barrier properties the resulting biaxially stretched bottle were evaluated by a procedure similar to that in Example 1.

The results are shown in Table 14.

Comparative Example 50

Example 38 was repeated except that the stretch index was set at 92 cm and that the total weight of the preform was increased by 10% in Example 38 to obtain at first a preform for biaxial stretching and then a biaxially stretched bottle from the preform.

The transparency and gas barrier properties of the biaxially stretched bottle were evaluated by a procedure similar to that in Example 1.

The results are shown in Table 14.

Comparative Example 51

Example 39 was repeated except that the stretch index was set at 95 cm and that the total weight of the preform was increased by 10% in Example 39 to obtain at first a preform for biaxial stretching and then a biaxially stretched bottle from the preform.

The transparency and gas barrier properties of the biaxially stretched bottle were evaluated by a procedure similar to that in Example 1.

The results are shown in Table 14.

Comparative Example 52

Example 39 was repeated except that the stretch index was set at 92 cm and that the total weight of the preform was increased by 10% in Example 39 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 14.

TABLE 14

| Item | Unit | Example 39 | Example 40 | Comp. Ex. 51 | Comp. Ex. 52 |
|---|---|---|---|---|---|
| PET/copolyester (wt. ratio) |  | 30/70 | 30/70 | 30/70 | 30/70 |
| Stretch index | cm | 168 | 158 | 95 | 92 |
| Total wt. of bottle | g | 54 | 21 | 60 | 23 |

TABLE 14-continued

| Item | Unit | Example 39 | Example 40 | Comp. Ex. 51 | Comp. Ex. 52 |
|---|---|---|---|---|---|
| Thickness of bottle body (part at haze measurement) | mm | 0.35 | 0.25 | 0.36 | 0.26 |
| Transparency | | | | | |
| Total haze | % | 0.1 | 0.1 | 0.3 | 0.2 |
| Internal haze | % | 0 | 0 | 0.2 | 0.1 |
| $CO_2$ permeability coefficient 23° C., 0% RH (Permatran method) | $\frac{cc \cdot mm}{m^2 D \cdot atm}$ | 5.2 | 5.3 | 5.5 | 6.0 |
| $O_2$ permeability coefficient 23° C., 0% RH (Oxtran method) | $\frac{cc \cdot mm}{m^2 D \cdot atm}$ | 1.3 | 1.4 | 1.6 | 1.8 |
| Pressure resistance | $kg/cm^2$ | 17 | 19 | 15 | 17 |

EXAMPLE 41

The resins described below were used for preparing a polyester resin composition for high stretch molding.

Polyethylene terephthalate: a resin (trade name of J 135, manufactured by Mitsui PET Resin K.K.) having a relative viscosity (IV) of 0.85 dl/g measured in o-chlorophenol at 25° C.;

Copolyester: the dicarboxylic acid component thereof being composed of 90 mol % of isophthalic acid constituent units and 10 mol % of terephthalic acid constituent units, the dihydroxy compound component thereof being composed of 15 mol % of dihydroxy-ethoxyresorcinol constituent units and 85 mol % of ethylene glycol constituent units, the copolyester comprising 0.3 part by mol of trimethylolpropane constituent units based on 100 parts by mol of the dicarboxylic acid component and having a relative viscosity (IV) of 0.85 dl/g measured in o-chlorophenol at 25° C.

After mixing 5% by weight of the copolyester and 95% by weight of the polyethylene terephthalate mentioned above, the resulting polyester resin composition (III) was molded by a molding machine (trade name of M-100A, manufactured by Meiki Seisakusho K.K.) to obtain a preform for forming a bottle. The molding temperature was 270° to 290° C.

The preform obtained as described above was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 $cm^3$, and that (excluding the stopper part) of the resulting stretched bottle was 1469 $cm^3$.

The internal surface area (excluding the internal surface area of the stopper part) of the stretched bottle was 678 $cm^2$.

The stretch index is therefore calculated as follows:

stretch index=1469/19×1/0.46=168

The resulting biaxially stretched bottle was evaluated by a procedure similar to that in Example 1.

The results are shown in Table 15.

EXAMPLE 42

Example 1 was repeated except that a copolyester described below was used and that a resin composition composed of 10% by weight of the copolyester and 90% by weight of the polyethylene terephthalate employed in Example 41 was used to obtain at first a preform for biaxially stretch molded article and then a biaxially stretched bottle from the preform.

Copolyester: the dicarboxylic acid component thereof being composed of 90 mol % of isophthalic acid constituent units and 10 mol % of terephthalic acid constituent units, the dihydroxy compound component thereof being composed of 7.5 mol % of dihydroxy-ethoxyresorcinol constituent units and 92.5 mol % of ethylene glycol constituent units, the copolyester comprising 0.3 part by mol of trimethylolpropane constituent units based on 100 parts by mol of the dicarboxylic acid constituent units, and having a relative viscosity (IV) of 0.85 dl/g measured in o-chlorophenol at 25° C.

The transparency and gas barrier properties of the resulting biaxially stretched bottle was evaluated by a procedure similar to that in Example 1.

The results are shown in Table 15.

EXAMPLE 43

Example 41 was repeated except that a copolyester described below was used and that a resin composition composed of 20% by weight of the copolyester and 80% by weight of the polyethylene terephthalate employed in Example 41 was used to obtain at first a preform for biaxially stretch molded article and then a biaxially stretched bottle from the preform.

Copolyester: the dicarboxylic acid component thereof being composed of 80 mol % of isophthalic acid constituent units and 20 mol % of terephthalic acid constituent units, the dihydroxy compound component thereof being composed of 15 mol % of dihydroxy-ethoxyresorcinol constituent units and 85 mol % of ethylene glycol constituent units, the copolyester comprising 0.3 part by mol of trimethylolpropane constituent units based on 100 parts by mol of the dicarboxylic acid component, and having a relative viscosity (IV) of 0.85 dl/g measured in o-chlorophenol at 25° C.

The transparency and gas barrier properties of the resulting biaxially stretched bottle were evaluated by a procedure similar to that in Example 1.

The results are shown in Table 15.

Comparative Examples 53, 54 and 55

The procedure of Examples 41, 42 and 43 was repeated except that the stretching index between the preform for the biaxially stretch molded article and the stretched bottle was set at 95 cm in Example 41, 42 and 43 to obtain biaxially stretched bottles. The transparency and gas barrier properties of the resulting bottles were evaluated.

The results are shown in Table 15.

Comparative Example 56

Comparative Example 53 was repeated except that only the polyethylene terephthalate was used without using the copolyester in Comparative Example 51 to obtain a biaxially stretched bottle. The transparency and gas barrier properties of the resulting bottle were evaluated.

The results are shown in Table 15.

Comparative Example 57

Example 41 was repeated except that only the polyethylene terephthalate was used without using the copolyester to obtain a biaxially stretched bottle. The transparency and gas barrier properties thereof were evaluated.

The results are shown in Table 15.

$f = 345/519 = 0.67$.

The transparency and gas barrier properties of the resulting biaxially stretched bottle were evaluated by a procedure similar to that in Example 1.

The results are shown in Table 16.

EXAMPLE 45

Example 44 was repeated except that the polyester resin composition employed in Example 42 was used to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 16.

EXAMPLE 46

Example 44 was repeated except that the polyester resin composition employed in Example 43 was used to obtain at first a preform for biaxial stretching and then a biaxially stretched bottle from the preform.

TABLE 15

| Item | Unit | Ex. 41 | Ex. 42 | Ex. 43 | Comp. Ex. 53 | Comp. Ex. 54 | Comp. Ex. 55 | Comp. Ex. 56 | Comp. Ex. 57 |
|---|---|---|---|---|---|---|---|---|---|
| PET/copolyester (wt. ratio) | | 95/5 | 90/10 | 80/20 | 95/5 | 90/10 | 80/20 | 100/0 | 100/0 |
| Stretch index | cm | 168 | 168 | 168 | 95 | 95 | 95 | 95 | 168 |
| Thickness of bottle body (part at haze measurement) | mm | 0.44 | 0.38 | 0.37 | 0.41 | 0.34 | 0.30 | 0.40 | 0.40 |
| Transparency | | | | | | | | | |
| Total haze | % | 0.6 | 0.5 | 0.7 | 0.1 | 0.1 | 0.4 | 0.1 | 4.2 |
| Internal haze | % | 0.4 | 0.5 | 0.4 | 0.1 | 0 | 0.1 | 0.1 | 4.0 |
| $CO_2$ permeability coefficient | $\frac{cc}{day \cdot atm}$ | 5.17 | 4.49 | 3.58 | 6.82 | 6.65 | 6.06 | 8.53 | 7.61 |
| $O_2$ permeability coefficient | $\frac{cc \cdot mm}{m^2 D \cdot atm}$ | 1.60 | 1.33 | 1.15 | 1.79 | 1.54 | 1.27 | 1.98 | 1.79 |
| Buckling strength v = 10 mm/min | kg | 60 | 58 | 55 | 57 | 34 | 25 | 51 | 48 |
| Dropping strength | | | | | | | | | |
| Min. destruction height | m | 5.5 | 5.0 | 3.5 | 4.5 | 2.5 | 2.0 | 5.5 | 5.0 |
| Strength maintenance ratio | % | 96 | 93 | 75 | 91 | 73 | 51 | 96 | 93 |
| Density | g/cc | 1.367 | 1.370 | 1.369 | 1.363 | 1.365 | 1.364 | 1.366 | 1.375 |

EXAMPLE 44

A preform for forming a bottle was prepared by molding polyester resin composition [IV] employed in Example 41 using a molding machine (trade name of ASB-50HT, manufactured by Nissei ASB K.K.). The molding temperature was 260° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm³, and that (excluding the stopper part) of the resulting stretched bottle was 519 cm³.

The internal surface area (excluding the stopper part) of the stretched bottle was 345 cm².

The stretch index is therefore calculated as follows:

stretch index = $519/4.9 \times 1/0.67 = 158$

The transparency and gas barrier properties of the resulting biaxially stretched bottle were evaluated by a procedure similar to that in Example 1.

The results are shown in Table 16.

Comparative Example 58

Example 44 was repeated except that the stretch index was set at 92 cm in Example 44 to obtain at first a preform and then a biaxially stretched bottle from the preform.

The transparency and gas barrier properties of the resulting biaxially stretched bottle were evaluated by a procedure similar to that in Example 1.

The results are shown in Table 16.

Comparative Example 59

Example 44 was repeated except that the stretch index was set at 92 cm in Example 45 to obtain at first a preform and then a biaxially stretched bottle from the preform.

The transparency and gas barrier properties of the resulting bottle were evaluated by a procedure similar to that in Example 1.

The results are shown in Table 16.

Comparative Example 60

Example 44 was repeated except that the stretch index was set at 92 cm in Example 46 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 16.

Comparative Example 61

Example 44 was repeated except that only the polyethylene terephthalate was used and that the stretch index was set at 92 cm to obtain a biaxially stretched bottle from the preform.

The transparency and gas barrier properties of the resulting biaxially stretched bottle were evaluated by a procedure similar to that in Example 1.

The results are shown in Table 16.

Comparative Example 62

Example 44 was repeated except that only the polyethylene terephthalate was used to obtain at first a preform for biaxial stretching and then a biaxially stretched bottle from the preform.

The transparency and gas barrier properties of the bottle were evaluated by a procedure similar to that in Example 1.

The results are shown in Table 16.

EXAMPLE 47

A polyester resin composition was prepared by blending 99% by weight of a polyethylene terephthalate with 1% of a polyethylene naphthalate having an intrinsic viscosity [η] of 0.70 dl/g.

The thus obtained polyester resin composition was molded by a molding machine (trade name of M-100A, manufactured by Meiki Seisakusho K.K.) to obtain a preform for molding a bottle. The molding temperature was 270° to 290° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 $cm^3$, and that (excluding the stopper part) of the resulting stretched bottle was 1469 $cm^3$.

The internal surface area (excluding the internal surface area of the stopper part) of the stretched bottle was 678 $cm^2$.

The stretch index is therefore calculated as follows:

stretch index=1469/19×1/0.46=168.

The resulting biaxially stretched bottle was evaluated by a procedure similar to that in Example 1.

The results are shown in Table 17.

EXAMPLE 48

Example 47 was repeated except that there was prepared a polyester resin composition composed of 90% by weight of the polyethylene terephthalate and 10% by weight of the polyethylene naphthalate to obtain at first a preform for biaxial stretching and then a biaxially stretched bottle prepared from the preform.

TABLE 16

| Item | Unit | Ex. 44 | Ex. 45 | Ex. 46 | Comp. Ex. 58 | Comp. Ex. 59 | Comp. Ex. 60 | Comp. Ex. 61 | Comp. Ex. 62 |
|---|---|---|---|---|---|---|---|---|---|
| PET/copolyester (wt. ratio) | | 95/5 | 90/10 | 80/20 | 95/5 | 90/10 | 80/20 | 100/0 | 100/0 |
| Stretch index | cm | 158 | 158 | 158 | 92 | 92 | 92 | 92 | 158 |
| Transparency | | | | | | | | | |
| Total haze | % | 2.0 | 1.5 | 0.5 | 1.5 | 0.7 | 0.4 | 0.1 | 2.2 |
| Internal haze | % | 1.2 | 0.9 | 0.3 | 0.8 | 0.4 | 0.2 | 0 | 1.7 |
| $CO_2$ permeability coefficient 23° C., 0% RH (Permatran method) | $\frac{cc}{day \cdot atm}$ | 6.6 | 6.3 | 5.1 | 9.3 | 7.5 | 6.0 | 11.3 | 10.1 |
| $O_2$ permeability coefficient 23° C., 0% RH (Oxtran method) | $\frac{cc \cdot mm}{m^2 D \cdot atm}$ | 1.8 | 1.4 | 1.2 | 2.1 | 1.8 | 1.5 | 2.3 | 2.1 |
| Buckling strength v = 10 mm/min | kg | 43 | 42 | 40 | 32 | 30 | 28 | 30 | 43 |
| Dropping strength | | | | | | | | | |
| Min. destruction height | m | >5.4 | >5.4 | >5.4 | >5.4 | 5.0 | 3.0 | >5.4 | >5.4 |
| Strength maintenance ratio | % | 100 | 100 | 100 | 100 | 96 | 76 | 100 | 100 |
| Density | g/cc | 1.373 | 1.371 | 1.367 | 1.363 | 1.360 | 1.357 | 1.365 | 1.370 |

The transparency and gas barrier properties of the resulting biaxially stretched bottle was evaluated by a procedure similar to that in Example 1.

The results are shown in Table 17.

Comparative Examples 63 and 64

The procedure of Examples 47 and 48 was repeated except that the stretch index was set at 95 cm and that the total weight of the bottle (preform) was increased by 11% in Examples 47 and 48 to obtain biaxially stretched bottles. The transparency and gas barrier properties of the bottles were evaluated.

The results are shown in Table 17.

EXAMPLE 49

A preform for forming a bottle was prepared by molding the polyester resin composition employed in Example 47 using a molding machine (trade name of ASB-50HT, manufactured by Nissei ASB K.K.). The molding temperature was 270° to 290° C.

The thus obtained preform was molded by a molding machine (trade name of LB-01, manufactured by Corpoplast Co., Ltd.) to obtain a biaxially stretched bottle. The stretching temperature was 110° to 130° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:
stretch index=519/4.9×1/0.67=158
f=345/519=0.67.

The transparency and gas barrier properties of the resulting biaxially stretched bottle were evaluated by a procedure similar to that in Example 1.

The results are shown in Table 17.

EXAMPLE 50

Example 49 was repeated except that the copolyester employed in Example 48 was used to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 17.

Comparative Example 65

Example 49 was repeated except that the stretch index was set at 92 cm and that the total weight of the bottle (preform) was increased by 11% in Example 49 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 17.

Comparative Example 66

Example 49 was repeated except that the stretch index was set at 92 cm and that the total weight of the bottle (preform) was increased by 11% in Example 50 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 17.

TABLE 17

| Item | Unit | Ex. 47 | Ex. 48 | Ex. 49 | Ex. 50 | Comp. Ex. 63 | Comp. Ex. 64 | Comp. Ex. 65 | Comp. Ex. 66 |
|---|---|---|---|---|---|---|---|---|---|
| PET/PEN (wt. ratio) | 99/1 | 90/10 | 99/1 | 90/10 | 99/1 | 90/10 | 99/1 | 90/10 | |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.41 | 0.39 | 0.31 | 0.30 | 0.40 | 0.38 | 0.30 | 0.28 |
| Transparency | | | | | | | | | |
| Total haze | % | 0.6 | 0.3 | 0.3 | 0.2 | 0.8 | 0.7 | 0.5 | 0.4 |
| Internal haze | % | 0.3 | 0.2 | 0.1 | 0.1 | 0.6 | 0.4 | 0.3 | 0.2 |
| $CO_2$ permeability coefficient 23° C., 0% RH (Permatran method) | $\frac{cc}{day \cdot atm}$ | 7.0 | 6.1 | 9.6 | 6.6 | 7.5 | 6.7 | 11.0 | 7.4 |
| $O_2$ permeability coefficient 23° C., 0% RH (Oxtran method) | $\frac{cc \cdot mm}{m^2 D \cdot atm}$ | 1.7 | 1.3 | 1.8 | 1.1 | 1.7 | 1.5 | 2.1 | 1.3 |
| Pressure resistance | kg/cm$^2$ | 18 | 17 | 17 | 15 | 15 | 13 | 14 | 12 |

EXAMPLE 51

A dicarboxylic acid component composed of 99 mol % of terephthalic acid and 1 mol % of isophthalic acid was esterified with a dihydroxy compound component composed of 85 mol % of ethylene glycol and 15 mol % of 1,3-bis(2-hydroxyethoxy)benzene, said dihydroxy compound component comprising 0.05 part by mol of a polyfunctional hydroxy compound based on 100 parts by mol of the dicarboxylic acid component, by a conventional method to obtain a copolyester having an intrinsic viscosity [η] of 0.84 dl/g.

The thus obtained copolyester was molded by a molding machine (trade name of M-100A, manufactured by Meiki Seisakusho K.K.) to obtain a preform for molding a bottle. The molding temperature was 270° to 290° C.

The thus obtained preform was molded by a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 19 cm$^3$, and that (excluding the stopper part) of the resulting stretched bottle was 1469 cm$^3$.

The internal surface area (excluding the internal surface area of the stopper part) of the stretched bottle was 678 cm$^2$.

The stretch index is therefore calculated as follows:

stretch index=1469/19×1/0.46=168.

The resulting biaxially stretched bottle was evaluated by a procedure similar to that in Example 1.

The results are shown in Table 18

EXAMPLE 52

A dicarboxylic acid component composed of 96 mol % of terephthalic acid and 4 mol % of isophthalic acid was esterified with a dihydroxy compound component composed of 85 mol % of ethylene glycol and 15 mol % of 1,3-bis(2-hydroxyethoxy)benzene, said dihydroxy compound component comprising 0.05 part by mol of a polyfunctional hydroxy compound based on 100 parts by mol of the dicarboxylic acid component, by the prior art method to obtain a copolyester having an intrinsic viscosity [η] of 0.85 dl/g.

Example 51 was repeated except that the copolyester prepared in Example 52 was used to obtain at first a preform for a biaxially stretch molded article and then a biaxially stretched bottle from the preform.

The transparency and gas barrier properties of the resulting biaxially stretched bottle were evaluated by a procedure similar to that in Example 1.

The results are shown in Table 18.

Comparative Example 67 and 68

The procedure of Example 51 and 52 was repeated except that the stretch index was set at 95 cm and that the total weight of the bottle (preform) was increased by 11% in Example 51 and 52 to obtain a biaxially stretched bottle. The transparency and gas barrier properties of the bottle were evaluated.

The results are shown in Table 18.

EXAMPLE 53

A preform for forming a bottle was prepared by molding the copolyester employed in Example 51 using a molding machine (trade name of ASB-50HT, manufactured by Nissei ASB K.K.). The molding temperature was 260° to 270° C.

The thus obtained preform was molded by a procedure similar to that in Example 1 using a molding machine (trade name of LB-01, manufactured by Corpoplast Co., Ltd.) to obtain a biaxially stretched bottle. The stretching temperature was 80° to 110° C.

The internal volume (excluding the stopper part) of the unstretched preform was 4.9 cm$^3$, and that (excluding the stopper part) of the resulting stretched bottle was 519 cm$^3$.

The internal surface area (excluding the stopper part) of the stretched bottle was 345 cm$^2$.

The stretch index is therefore calculated as follows:

stretch index=519/4.9×1/0.67=158 f=345/519=0.67.

The transparency and gas barrier properties of the resulting biaxially stretched bottle were evaluated by a procedure similar to that in Example 1.

The results are shown in Table 18.

EXAMPLE 54

Example 53 was repeated except that there was used the polyester resin composition employed in Example 52 to obtain at first a preform for biaxial stretching and then a biaxially stretched bottle prepared from the preform.

The transparency and gas barrier properties of the resulting biaxially stretched bottle were evaluated by a procedure similar to that in Example 1.

The results are shown in Table 18.

Comparative Example 69

Example 53 was repeated except that the stretch index was set at 92 cm and that the total weight of the bottle (preform) was increased by 11% in Example 53 to obtain at first a preform for biaxial stretching and then a biaxially stretched bottle prepared from the preform.

The transparency and gas barrier properties of the resulting biaxially stretched bottle were evaluated by a procedure similar to that in Example 1.

The results are shown in Table 18.

Comparative Example 70

Example 54 was repeated except that the stretch index was set at 92 cm and that the total weight of the bottle (preform) was increased by 11% in Example 54 to obtain at first a preform for biaxial stretching and then a biaxially stretched bottle from the preform.

The transparency and gas barrier properties of the resulting biaxially stretched bottle were evaluated by a procedure similar to that in Example 1.

The results are shown in Table 18.

TABLE 18

| Item | Unit | Ex. 51 | Ex. 52 | Ex. 53 | Ex. 54 | Comp. Ex. 67 | Comp. Ex. 68 | Comp. Ex. 69 | Comp. Ex. 70 |
| --- | --- | --- | --- | --- | --- | --- | --- | --- | --- |
| Amount of comonomer | mol % | 1 | 4 | 1 | 4 | 1 | 4 | 1 | 4 |
| Stretch index | cm | 168 | 168 | 158 | 158 | 95 | 95 | 92 | 92 |
| Total wt. of bottle | g | 54 | 54 | 21 | 21 | 60 | 60 | 23 | 23 |
| Thickness of bottle body (part at haze measurement) | mm | 0.39 | 0.38 | 0.28 | 0.28 | 0.40 | 0.40 | 0.29 | 0.28 |

TABLE 18-continued

| Item | Unit | Ex. 51 | Ex. 52 | Ex. 53 | Ex. 54 | Comp. Ex. 67 | Comp. Ex. 68 | Comp. Ex. 69 | Comp. Ex. 70 |
|---|---|---|---|---|---|---|---|---|---|
| Transparency | | | | | | | | | |
| Total haze | % | 0.5 | 0.3 | 0.3 | 0.2 | 0.5 | 0.4 | 0.3 | 0.3 |
| Internal haze | % | 0.2 | 0.2 | 0.2 | 0.1 | 0.3 | 0.2 | 0.2 | 0.1 |
| $CO_2$ permeability coefficient 23° C., 0% RH (Permatran method) | $\frac{cc \cdot mm}{m^2 D \cdot atm}$ | 8.0 | 5.4 | 9.8 | 7.0 | 8.7 | 7.1 | 11.8 | 7.7 |
| $O_2$ permeability coefficient 23° C., 0% RH (Oxtran method) | $\frac{cc \cdot mm}{m^2 D \cdot atm}$ | 1.7 | 1.6 | 2.0 | 1.9 | 2.0 | 1.9 | 2.3 | 2.1 |
| Pressure resistance | $kg/cm^2$ | 19 | 18 | 20 | 19 | 16 | 16 | 18 | 17 |

What is claimed:

1. A blow molded article having excellent transparency, moldability and gas barrier properties,
wherein the blow molded article is produced by blow molding at a temperature of 80°–110° C., and
the blow molded article is composed of a copolyester having an intrinsic viscosity (η) of 0.5–1.5 dl/g formed by esterification of monomers consisting essentially of dicarboxylic acid with a dihydroxy compound component and a polyfunctional hydroxy compound, said dicarboxylic acid comprising 0–80 mol % of terephthalic acid and 20–100 mol % of isophthalic acid, said dihydroxy compound component comprising 10–95 mol % of ethylene glycol and 5–90 mol % of 1,3-bis (2-hydroxyethoxy)benzene, and said polyfunctional hydroxy compound having at least three hydroxy groups and being used in an amount of 0.05–1.0 mol by part based on 100 mol by part of the dicarboxylic acid, and is highly oriented so that the stretch index defined by the following equations becomes not less than 130 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \; (cm^{-1}).$$

2. The blow molded article of claim 1 wherein said dicarboxylic acid comprises 2–50 mol % of terephthalic acid and 50–90 mol % of isophthalic acid, said dihydroxy compound component comprises 15–90 mol % of ethylene glycol and 10–85 mol % of 1,3-bis(2-hydroxyethoxy) benzene and said polyfunctional hydroxy compound comprises 0.1 to 0.5 mol part based on 100 mol part of the dicarboxylic acid.

3. The blow molded article of claim 1 wherein said polyfunctional hydroxy compound is a member selected from the group consisting of trimethylolmethane, trimethylolethane and trimethylolpropane.

4. The blow molded article of claim 1 wherein the stretch index is 150 to 200.

5. A blow molded article having excellent transparency, moldability and gas barrier properties,
wherein the blow molded article is produced by blow molding at a temperature of 80°–110° C., and
the blow molded article is composed of a copolyester having an intrinsic viscosity (η) of 0.5–1.5 dl/g formed by esterification of monomers consisting essentially of dicarboxylic acid with a hydroxy compound component and a polyfunctional hydroxy compound, said dicarboxylic acid comprising 85–99 mol % of terephthalic acid and 1–15 mol % of isophthalic acid, said dihydroxy compound component comprising 80–99 mol % of ethylene glycol and 1–20 mol % of 1,3-bis (2-hydroxyethoxy)benzene, and said polyfunctional hydroxy compound having at least three hydroxyl groups and being used in an amount of 0.05–0.3 mol by part based on 100 mol by part of the dicarboxylic acid, and is highly oriented so that the stretch index defined by the following equations becomes not less than 130 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \; (cm^{-1}).$$

6. The blow molded article of claim 5 wherein said dicarboxylic acid comprises 90–99 mol % of terephthalic acid and 1–10 mol % of isophthalic acid, said dihydroxy compound component comprises 85–99 mol % of ethylene glycol and 1–15 mol % of 1,3-bis(2-hydroxyethoxy)benzene and said polyfunctional hydroxy compound comprises 0.05–0.2 parts by mol based on 100 parts by mol of the dicarboxylic acid.

7. The blow molded article of claim 5 wherein said polyfunctional hydroxy compound is a member selected from the group consisting of trimethylolmethane, trimethylolethane and trimethylolpropane.

8. The blow molded article of claim 5 wherein the stretch index is 150 to 200.

9. A blow molded article having excellent transparency, moldability and gas barrier properties,
wherein the blow molded article is produced by blow molding at a temperature of 80°–110° C., and
the blow molded article is composed of a copolyester having an intrinsic viscosity (η) of 0.5–1.5 dl/g formed by esterification of monomers consisting essentially of dicarboxylic acid with a dihydroxy compound component and a polyfunctional hydroxy compound, said dicarboxylic acid consisting essentially of 2–50 mol % of terephthalic acid and 50–90 mol % of isophthalic acid, said dihydroxy compound component consisting essentially of 15–90 mol % of ethylene glycol and 10–85 mol % of 1,3-bis(2-hydroxyethoxy)benzene, and said polyfunctional hydroxy compound is a number selected from the group consisting of trimethylolmethane, trimethylolethane and trimethylolpropane and is used in an amount of 0.1–1.5 mol by part based on 100 mol by part of the dicarboxylic acid, and is highly oriented so that the stretch index defined by the following equations is 150 to 200 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \text{ (cm}^{-1}\text{)}.$$

10. A blow molded article having excellent transparency, moldability and gas barrier properties,
wherein the blow molded article is produced by blow molding at a temperature of 80°–110° C., and
the blow molded article is composed of a copolyester having an intrinsic viscosity (η) of 0.5–1.5 dl/g formed by esterification of monomers consisting essentially of dicarboxylic acid with a hydroxy compound component and a polyfunctional hydroxy compound, said dicarboxylic acid consisting essentially of 90–99 mol % of terephthalic acid and 1–10 mol % of isophthalic acid, said dihydroxy compound component consisting essentially of 85–99 mol % of ethylene glycol and 1–15 mol % of 1,3-bis(2-hydroxyethoxy)benzene, and said polyfunctional hydroxy compound is a member selected from the group consisting of trimethylolmethane, trimethylolethane and trimethylolpropane and is used in an amount of 0.05–0.2 mol by part based on 100 mol by part of the dicarboxylic acid, and is highly oriented so that the stretch index defined by the following equations is 150 to 200 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \text{ (cm}^{-1}\text{)}.$$

11. A blow molded article having excellent transparency, moldability and gas barrier properties,
wherein the blow molded article is produced by blow molding at a temperature of 80°–110° C., and
the blow molded article is composed of a copolyester having an intrinsic viscosity (η) of 0.5–1.5 dl/g formed by esterification of monomers consisting essentially of dicarboxylic acid with a dihydroxy compound component and a polyfunctional hydroxy compound, said dicarboxylic acid comprising 2–50 mol % of terephthalic acid and 50–90 mol % of isophthalic acid, said dihydroxy compound component comprising 15–90 mol % of ethylene glycol and 10–85 mol % of 1,3-bis (2-hydroxyethoxy)benzene, and said polyfunctional hydroxy compound having at least three hydroxy groups and being used in an amount of 0.1 to 0.5 mol by part based on 100 mol by part of the dicarboxylic acid, and is highly oriented so that the stretch index defined by the following equations is 150 to 200 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \text{ (cm}^{-1}\text{)}.$$

12. A blow molded article having excellent transparency, moldability and gas barrier properties,
wherein the blow molded article is produced by blow molding at a temperature of 80°–110° C. and
the blow molded article is composed of a copolyester having an intrinsic viscosity (η) of 0.5–1.5 dl/g formed by esterification of monomers consisting essentially of dicarboxylic acid with a hydroxy compound component and a polyfunctional hydroxy compound, said dicarboxylic acid comprising 90–99 mol % of terephthalic acid and 1–10 mol % of isophthalic acid, said dihydroxy compound component comprising 85–99 mol % of ethylene glycol and 1–15 mol % of 1,3-bis (2-hydroxyethoxy)benzene, and said polyfunctional hydroxy compound having at least three hydroxyl groups and being used in an amount of 0.05–0.2 mol by part based on 100 mol by part of the dicarboxylic acid, and is highly oriented so that the stretch index defined by the following equations is 150 to 200 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \text{ (cm}^{-1}\text{)}.$$

13. A blow molded article wherein the blow molded article is composed of a polyester resin composition comprising (A) 30–99% by weight of a polyethylene terephthalate resin and (B) 1–70% by weight of a copolyester formed by esterification of dicarboxylic acid with ethylene glycol, said dicarboxylic acid comprising 10–92 mol % of terephthalic acid and 8–90 mol % of isophthalic acid, and is highly oriented so that the stretch index as defined above becomes not less than 130 cm.

14. A blow molded article wherein the blow molded article is composed of a polyester resin composition comprising (A) 80–95% by weight of a polyethylene terephthalate resin and (B) 5–20% by weight of a copolyester formed by esterification of dicarboxylic acid with a dihydroxy compound component and a polyfunctional hydroxy compound, said dicarboxylic acid comprising 0–80 mol % of terephthalic acid and 20–100 mol % of isophthalic acid, said dihydroxy compound component comprising 10–95 mol % of ethylene glycol and 5–90 mol % of dihydroxyethoxy resorcinol, and said polyfunctional hydroxy compound having at least three hydroxyl groups and being used in an amount of 0.05–1.0 part by mol based on 100 parts by mol of the dicarboxylic acid, and is highly oriented so that the stretch index as defined above becomes not less than 130 cm.

15. A blow molded article wherein the blow molded article is composed of a copolyester having an intrinsic viscosity ($\eta$) of 0.5–1.5 dl/g formed by esterification of dicarboxylic acid with ethylene glycol, said dicarboxylic acid comprising 85–99.5 mol % of terephthalic acid and 0.5–15 mol % of isophthalic acid, and is highly oriented so that the stretch index defined by the following equations becomes not less than 130 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

16. The blow molded article of claim 15 wherein said dicarboxylic acid comprises 90–99.5 mol % of terephthalic acid and 0.5–10 mol % of isophathalic acid.

17. The blow molded article of claim 15 wherein the stretch index is 150 to 200.

18. A blow molded article wherein the blow molded article is composed of a copolyester having an intrinsic viscosity ($\eta$) of 0.5–1.5 dl/g formed by esterification of terephthalic acid with a dihydroxy compound component comprising 93–98 mol % of ethylene glycol and 2–7 mol % of diethylene glycol, and is highly oriented so that the stretch index defined by the following equations becomes not less than 130 cm $$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

19. The blow molded article of claim 18 herein said dihydroxy compound component comprises 95–98 mol % of ethylene glycol and 2–5 mol % of diethylene glycol.

20. The blow molded article of claim 18 wherein the stretch index is 150 to 200.

21. A process for preparing a blow molded article which process comprises (a) forming a preform from a copolyester having an intrinsic viscosity ($\eta$) of 0.5–1.5 dl/g formed by esterification of monomers consisting essentially of dicarboxylic acid with a dihydroxy compound component and a polyfunctional hydroxy compound, said dicarboxylic acid comprising 0–80 mol % of terephthalic acid and 20–100 mol % of isophthalic acid, said dihydroxy compound component comprising 10–95 mol % of ethylene glycol and 5–90 mol % of 1,3-bis(2-hydroxyethoxy)benzene, and said polyfunctional hydroxy compound having at least three hydroxy groups and being used in an amount of 0.05–1.0 mol by part based on 100 mol by part of the dicarboxylic acid, and (b) blow-molding the preform at a temperature of 80°–110° C. such that the stretch index is not less than 130 cm, wherein the stretch index is defined by the following equations:

$$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

22. The process as claimed in claim 21 wherein said dicarboxylic acid comprises 2–50 mol % of terephthalic acid and 50–90 mol % of isophthalic acid, said dihydroxy compound component comprises 15–90 mol % of ethylene glycol and 10–85 mol % of 1,3-bis(2-hydroxyethoxy)benzene and said polyfunctional hydroxy compound comprises 0.1 to 0.5 mol part based on 100 mol part of the dicarboxylic acid.

23. The process as claimed in claim 21 wherein said polyfunctional hydroxy compound is a member selected from the group consisting of trimethylolmethane, trimethylolethane and trimethylolpropane.

24. The process as claimed in claim 21 wherein the stretch index is 150 to 200 cm.

25. A process for preparing a blow molded article which process comprises (a) forming a preform from a copolyester having an intrinsic viscosity ($\eta$) of 0.5–1.5 dl/g formed by esterification of monomers consisting essentially of dicarboxylic acid with a dihydroxy compound component and a polyfunctional hydroxy compound, said dicarboxylic acid comprising 85–99 mol % of terephthalic acid and 1–15 mol % of isophthalic acid, said dihydroxy compound component comprising 80–99 mol % of ethylene glycol and 1–20 mol % of 1,3-bis(2-hydroxyethoxy)benzene, and said polyfunctional hydroxy compound having at least three hydroxy groups and being used in an amount of 0.05–0.3 mol by part based on 100 mol by part of the dicarboxylic acid, and (b) blow-molding the preform at a temperature of 80°–110° C. such that the stretch index is not less than 130 cm, wherein the stretch index is defined by the following equations:

$$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

26. The process as claimed in claim 25 wherein said dicarboxylic acid comprises 90–99 mol % of terephthalic acid and 1–50 mol % of isophthalic acid, said dihydroxy compound component comprises 85–99 mol % of ethylene glycol and 1–15 mol % of 1,3-bis(2-hydroxyethoxy)benzene and said polyfunctional hydroxy compound comprises 0.05 to 0.2 parts by mol based on 100 mol parts of the dicarboxylic acid.

27. The process as claimed in claim 25 wherein said polyfunctional hydroxy compound is a member selected from the group consisting of trimethylotmethane, trimethylolethane and trimethylolpropane.

28. The process as claimed in claim 25 wherein the stretch index is 150 to 200 cm.

29. A process for preparing a blow molded article which process comprises
(a) forming a preform from a copolyester having an intrinsic viscosity ($\eta$) of 0.5–1.5 dl/g formed by esterification of monomers consisting essentially of dicarboxylic acid with a dihydroxy compound component and a polyfunctional hydroxy compound, said dicarboxylic acid consisting essentially of 2–50 mol % of terephthalic acid and 50–90 mol % of isophthalic acid, said dihydroxy compound component consisting essentially of 15–90 mol % of ethylene glycol and 10–85 mol % of 1,3-bis(2-hydroxyethoxy)benzene, and said polyfunctional hydroxy compound is selected from the group consisting of trimethylolmethane, trimethylolethane and trimethylolpropane and is used in an amount of 0.1–1.5 mol by part based on 100 mol by part of the dicarboxylic acid, and
(b) blow-molding the preform at a temperature of 80°–110° C. such that the stretch index is 150–200 cm, wherein the stretch index is defined by the following equations:

$$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

30. A process for preparing a blow molded article which process comprises
(a) forming a preform from a copolyester having an intrinsic viscosity ($\eta$) of 0.5–1.5 dl/g formed by esterification of monomers consisting essentially of dicarboxylic acid with a dihydroxy compound component and a polyfunctional hydroxy compound, said dicarboxylic acid consisting essentially of 90–99 mol % of terephthalic acid and 1–10 mol % of isophthalic acid, said dihydroxy compound component consisting essentially of 85–99 mol % of ethylene glycol and 1–15 mol % of 1,3-bis(2-hydroxyethoxy)benzene, and said polyfunctional hydroxy compound is selected from the group consisting of trimethylolmethane, trimethylolethane and trimethylolpropane and is used in an amount of 0.05–0.2 mol by part based on 100 mol by part of the dicarboxylic acid, and
(b) blow-molding the preform at a temperature of 80°–110° C. such that the stretch index is 150–200 cm, wherein the stretch index is defined by the following equations:

$$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

31. A process for preparing a blow molded article having excellent transparency, moldability and gas barrier properties, which process comprises
(a) forming a preform from a copolyester having an intrinsic viscosity ($\eta$) of 0.5–1.5 dl/g formed by esterification of monomers consisting essentially of dicarboxylic acid with a dihydroxy compound component and a polyfunctional hydroxy compound, said dicarboxylic acid comprising 2–50 mol % of terephthalic acid and 50–90 mol % of isophthalic acid, said dihydroxy compound component comprising 15–90 mol % of ethylene glycol and 10–85 mol % of 1,3-bis(2-hydroxyethoxy)benzene, and said polyfunctional hydroxy compound having at least three hydroxy groups and being used in an amount of 0.1–0.5 mol by part based on 100 mol by part of the dicarboxylic acid, and
(b) blow-molding the preform at a temperature of 80°–110° C. such that the stretch index is 150–200 cm, wherein the stretch index is defined by the following equations:

$$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

32. A process for preparing a blow molded article having excellent transparency, moldability and gas barrier properties, which process comprises
(a) forming a preform from a copolyester having an intrinsic viscosity ($\eta$) of 0.5–1.5 dl/g formed by esterification of monomers consisting essentially of dicarboxylic acid with a dihydroxy compound component and a polyfunctional hydroxy compound, said dicarboxylic acid comprising 90–99 mol % of terephthalic acid and 1–10 mol % of isophthalic acid, said dihydroxy compound component comprising 85–99 mol % of ethylene glycol and 1–15 mol % of 1,3-bis(2-hydroxyethoxy)benzene, and said polyfunctional hydroxy compound having at least three hydroxy groups and being used in an amount of 0.05–0.2 mol by part based on 100 mol by part of the dicarboxylic acid, and
(b) blow-molding the preform at a temperature of 80°–110° C. such that the stretch index is 150–200 cm, wherein the stretch index is defined by the following equations:

$$\text{Stretch index} = \frac{\text{Internal volume of oriented bottle (excluding stopper portion)}}{\text{Internal volume of unoriented preform (excluding stopper portion)}} \times \frac{1}{f}$$

$$f = \frac{\text{Internal surface area of oriented bottle (excluding stopper portion)}}{\text{Internal volume of oriented bottle (excluding stopper portion)}} \ (\text{cm}^{-1}).$$

* * * * *